United States Patent
Suh et al.

(10) Patent No.: US 7,801,532 B2
(45) Date of Patent: Sep. 21, 2010

(54) SYSTEM AND METHOD FOR TRANSMITTING/RECEIVING SIGNAL IN A FREQUENCY OVERLAY COMMUNICATION SYSTEM

(75) Inventors: Chang-Ho Suh, Seongnam-si (KR); Dong-Seek Park, Yongin-si (KR); Young-Kwon Cho, Suwon-si (KR); Eun-Taek Lim, Suwon-si (KR); Jin-Kyu Koo, Suwon-si (KR); Jung-Soo Woo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1119 days.

(21) Appl. No.: 11/477,247

(22) Filed: Jun. 29, 2006

(65) Prior Publication Data

US 2007/0076817 A1    Apr. 5, 2007

(30) Foreign Application Priority Data

Jun. 29, 2005    (KR) ..................... 10-2005-0056994

(51) Int. Cl.
   *H04W 40/00*    (2009.01)
(52) U.S. Cl. ................... 455/447; 455/446; 455/448; 455/450; 455/452.1; 455/454; 375/146; 375/147; 375/148; 375/219; 375/303; 375/340
(58) Field of Classification Search ......... 455/446–448, 455/452.1–452.2, 453–454, 192.1–192.2, 455/205–206, 450; 375/219, 229–232, 340, 375/343–344, 303, 146–148
See application file for complete search history.

(56) References Cited

U.S. PATENT DOCUMENTS

| | | | | |
|---|---|---|---|---|
| 5,323,391 A | * | 6/1994 | Harrison | 370/210 |
| 5,490,172 A | * | 2/1996 | Komara | 375/296 |
| 5,710,763 A | * | 1/1998 | Harrison | 370/307 |
| 5,867,479 A | * | 2/1999 | Butash | 370/210 |
| 6,134,268 A | * | 10/2000 | McCoy | 375/229 |
| 6,411,653 B1 | * | 6/2002 | Arunachalam et al. | 375/260 |
| 2005/0100039 A1 | | 5/2005 | Husted et al. | |
| 2005/0111568 A1 | | 5/2005 | Adachi | |

FOREIGN PATENT DOCUMENTS

| | | |
|---|---|---|
| KR | 1997-7000402 | 1/1997 |
| KR | 1020000052863 | 8/2000 |
| KR | 1020010023224 | 3/2001 |

* cited by examiner

*Primary Examiner*—Tuan A Tran
(74) *Attorney, Agent, or Firm*—The Farrell Law Firm, LLP

(57) ABSTRACT

A method for transmitting a signal by a transmitter in a frequency overlay communication system. The method includes generating y first signal groups by shuffling input information data with a length yN on an N-by-N grouping basis according to a first shuffling scheme; generating y second signal groups by performing N-point IFFT on each of the first signal groups; generating y third signal groups by multiplying each of the second signal groups by preset values; generating N fourth signal groups by de-shuffling the third signal groups on a y-by-y grouping basis according to a de-shuffling scheme; generating N fifth signal groups by performing y-point IDFT on each of the fourth signal groups; generating y sixth signal groups by shuffling the fifth signal groups according to a second shuffling scheme, and serial-converting the sixth signal groups; and performing a transmission RF process on the serial-converted signal and transmitting the RF-processed signal to a receiver.

34 Claims, 9 Drawing Sheets

SYSTEM AND METHOD FOR TRANSMITTING/RECEIVING SIGNAL IN A FREQUENCY OVERLAY COMMUNICATION SYSTEM

PRIORITY

This application claims the benefit under 35 U.S.C. §119 (a) of an application filed in the Korean Intellectual Property Office on Jun. 29, 2005 and assigned Serial No. 2005-56994, the entire contents of which are incorporated herein by reference.

BACKGROUND OF THE INVENTION

1. Field of the Invention

The present invention relates generally to a system and method for transmitting/receiving signals in a communication system, and in particular, to a system and method for transmitting/receiving signals in a communication system using a frequency overlay scheme ("frequency overlay communication system").

2. Description of the Related Art

With the development of communication systems, the types of services provided are diversified, raising the need for a broadband communication system supporting broadband service. However, due to limited frequency resources, there is a limitation on the available frequency band. In addition, because backward compatibility with the previously deployed communication systems should also be taken into consideration, broadband communication system development is encountering adverse circumstances.

The current broadband communication systems were designed on the basic assumption that they are separately allocated different frequency bands to provide broadband service in their service areas. However, the increasing demand for frequency bands for broadband service increases the license cost for the frequency bands, making it impossible to use the various available schemes proposed to provide broadband service.

As a result, there is a need for a signal transmission/reception scheme for efficiently providing broadband service while overcoming the limitation on frequency bands, i.e., while solving high license cost problems for the frequency bands.

SUMMARY OF THE INVENTION

It is, therefore, an object of the present invention to provide a system and method for transmitting/receiving signals in a frequency overlay communication system.

It is another object of the present invention to provide a system and method for transmitting/receiving signals in a frequency overlay communication system, a bandwidth of an extended band of which is not $2^m$ times a bandwidth of a narrow band.

It is a further object of the present invention to provide a system and method for transmitting/receiving signals in a frequency overlay communication system, a bandwidth of an extended band of which is $2^m$ times a bandwidth of a narrow band.

According to one aspect of the present invention, there is provided a transmitter in a frequency overlay communication system. The transmitter includes a first shuffler for generating y first signal groups by shuffling input information data with a length yN on an N-by-N grouping basis according to a first shuffling scheme; N Inverse Fast Fourier Transform (IFFT) modules for generating y second signal groups by performing N-point IFFT on each of the first signal groups; y multipliers for generating y third signal groups by multiplying each of the second signal groups by preset values; a de-shuffler for generating N fourth signal groups by de-shuffling the third signal groups on a y-by-y grouping basis according to a de-shuffling scheme; N Inverse Discrete Fourier Transform (IDFT) modules for generating N fifth signal groups by performing y-point IDFT on each of the fourth signal groups; a second shuffler for generating y sixth signal groups by shuffling the fifth signal groups according to a second shuffling scheme; a parallel-to-serial (P/S) converter for serial-converting the sixth signal groups; and a transmission radio frequency (RF) processor for performing a transmission RF process on the serial-converted signal and transmitting the RF-processed signal to a receiver.

According to another aspect of the present invention, there is provided a receiver in a frequency overlay communication system. The receiver includes a reception RF processor for receiving a signal transmitted by a transmitter, and performing a reception RF process on the received signal; and a Fast Fourier Transform (FFT) module for performing FFT on the RF-processed signal. The frequency overlay communication system uses a second frequency band including a first frequency band used by a non-frequency overlay communication system.

According to further aspect of the present invention, there is provided a receiver in a frequency overlay communication system. The receiver includes a reception RF processor for receiving a signal transmitted by a transmitter, and performing a reception RF process on the received signal, thereby generating received data with a length yN; a first de-shuffler for generating N first signal groups by de-shuffling the received data with the length yN on a y-by-y grouping basis according to a first de-shuffling scheme; N Discrete Fourier Transform (DFT) modules for generating N second signal groups by performing DFT on each of the first signal groups; a shuffler for generating y third signal groups by shuffling the second signal groups on an N-by-N grouping basis according to a shuffling scheme; y multipliers for generating y fourth signal groups by multiplying each of the third signal groups by preset values; y FFT modules for generating y fifth signal groups by performing FFT on each of the fourth signal groups; a second de-shuffler for de-shuffling the fifth signal groups according to a second de-shuffling scheme; and a P/S converter for serial-converting the de-shuffled signal thereby restoring the received signal to information data with a length yN.

According to yet another aspect of the present invention, there is provided a transmitter in a frequency overlay communication system. The transmitter includes an IFFT module for performing IFFT on the information data if there is information data to transmit; and a transmission RF processor for performing a transmission RF process on the IFFT-processed signal and transmitting the RF-processed signal to a receiver. The frequency overlay communication system uses a second frequency band including a first frequency band used by a non-frequency overlay communication system.

According to still another aspect of the present invention, there is provided a method for transmitting a signal by a transmitter in a frequency overlay communication system. The method includes generating y first signal groups by shuffling input information data with a length yN on an N-by-N grouping basis according to a first shuffling scheme; generating y second signal groups by performing N-point IFFT on each of the first signal groups; generating y third signal groups by multiplying each of the second signal groups by preset values; generating N fourth signal groups by de-shuffling the third signal groups on a y-by-y grouping basis according to a de-shuffling scheme; generating N fifth signal groups by performing y-point IDFT on each of the fourth signal groups; generating y sixth signal groups by shuffling the fifth signal groups according to a second shuffling scheme, and serial-converting the sixth signal groups; and performing a transmission RF process on the serial-converted signal and transmitting the RF-processed signal to a receiver.

According to still another aspect of the present invention, there is provided a method for receiving a signal by a receiver in a frequency overlay communication system. The method includes receiving a signal transmitted by a transmitter, and performing a reception RF process on the received signal; and performing FFT on the RF-processed signal. The frequency overlay communication system uses a second frequency band including a first frequency band used by a non-frequency overlay communication system.

According to still another aspect of the present invention, there is provided a method for receiving a signal by a receiver in a frequency overlay communication system. The method includes receiving a signal transmitted by a transmitter, and performing a reception RF process on the received signal thereby generating received data with a length yN; generating N first signal groups by de-shuffling the received data with the length yN on a y-by-y grouping basis according to a first de-shuffling scheme; generating N second signal groups by performing DFT on each of the first signal groups; generating y third signal groups by shuffling the second signal groups on an N-by-N grouping basis according to a shuffling scheme; generating y fourth signal groups by multiplying each of the third signal groups by preset values; generating y fifth signal groups by performing FFT on each of the fourth signal groups; and de-shuffling the fifth signal groups according to a second de-shuffling scheme, and then serial-converting the de-shuffled signal, thereby restoring the received signal to information data with a length yN.

According to still another aspect of the present invention, there is provided a method for transmitting a signal by a transmitter in a frequency overlay communication system. The method if there is information data to transmit, performing inverse IFFT on the information data; and performing a transmission RF process on the IFFT-processed signal and transmitting the RF-processed signal to a receiver. The frequency overlay communication system uses a second frequency band including a first frequency band used by a non-frequency overlay communication system.

According to still another aspect of the present invention, there is provided a method for transmitting/receiving a signal in a frequency overlay communication system. The method includes generating, by a transmitter, y first signal groups by shuffling input information data with a length yN on an N-by-N grouping basis according to a first shuffling scheme; generating, by the transmitter, y second signal groups by performing N-point IFFT on each of the first signal groups; generating, by the transmitter, y third signal groups by multiplying each of the second signal groups by preset values; generating, by the transmitter, N fourth signal groups by de-shuffling the third signal groups on a y-by-y grouping basis according to a de-shuffling scheme; generating, by the transmitter, N fifth signal groups by performing y-point IDFT on each of the fourth signal groups; generating, by the transmitter, y sixth signal groups by shuffling the fifth signal groups according to a second shuffling scheme, and serial-converting the sixth signal groups; performing, by the transmitter, a transmission RF process on the serial-converted signal and transmitting the RF-processed signal to a receiver; receiving, by the receiver, the signal transmitted by the transmitter and performing a reception RF process on the received signal; and performing, by the receiver, FFT on the RF-processed signal.

According to still another aspect of the present invention, there is provided a method for transmitting/receiving a signal in a frequency overlay communication. The method if there is information data to transmit, performing, by a transmitter, IFFT on the information data; performing, by the transmitter, a transmission RF process on the IFFT-processed signal, and transmitting the RF-processed signal to a receiver; receiving, by the receiver, the signal transmitted by the transmitter, and performing a reception RF process on the received signal thereby generating received data with a length yN; generating, by the receiver, N first signal groups by de-shuffling the received data with the length yN on a y-by-y grouping basis according to a first de-shuffling scheme; generating, by the receiver, N second signal groups by performing DFT on each of the first signal groups; generating, by the receiver, y third signal groups by shuffling the second signal groups on an N-by-N grouping basis according to a shuffling scheme; generating, by the receiver, y fourth signal groups by multiplying each of the third signal groups by preset values; generating, by the receiver, y fifth signal groups by performing FFT on each of the fourth signal groups; and de-shuffling, by the receiver, the fifth signal groups according to a second de-shuffling scheme, and then serial-converting the de-shuffled signal, thereby restoring the received signal to information data with a length yN.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The present invention provides a system and method for transmitting/receiving signals in a communication system using a frequency overlay communication system. Further, the present invention provides a signal transmission/reception system and method in a frequency overlay communication system, capable of solving high license cost problems for frequency bands due to the limited frequency resources, guaranteeing backward compatibility with the existing communication systems due to the use of the frequency overlay communication system, and providing the maximum throughput through efficient scheduling. In addition, the present invention proposes a signal transmission/reception system and method for the case where a bandwidth of an extended band (EB) used in the frequency overlay communication system is not $2^m$ times, for example, y times (y≠$2^m$) a bandwidth of a narrow band (NB) used in the existing communication system deployed before the frequency overlay communication system is designed, i.e., a non-frequency overlay communication system.

Figure 1:
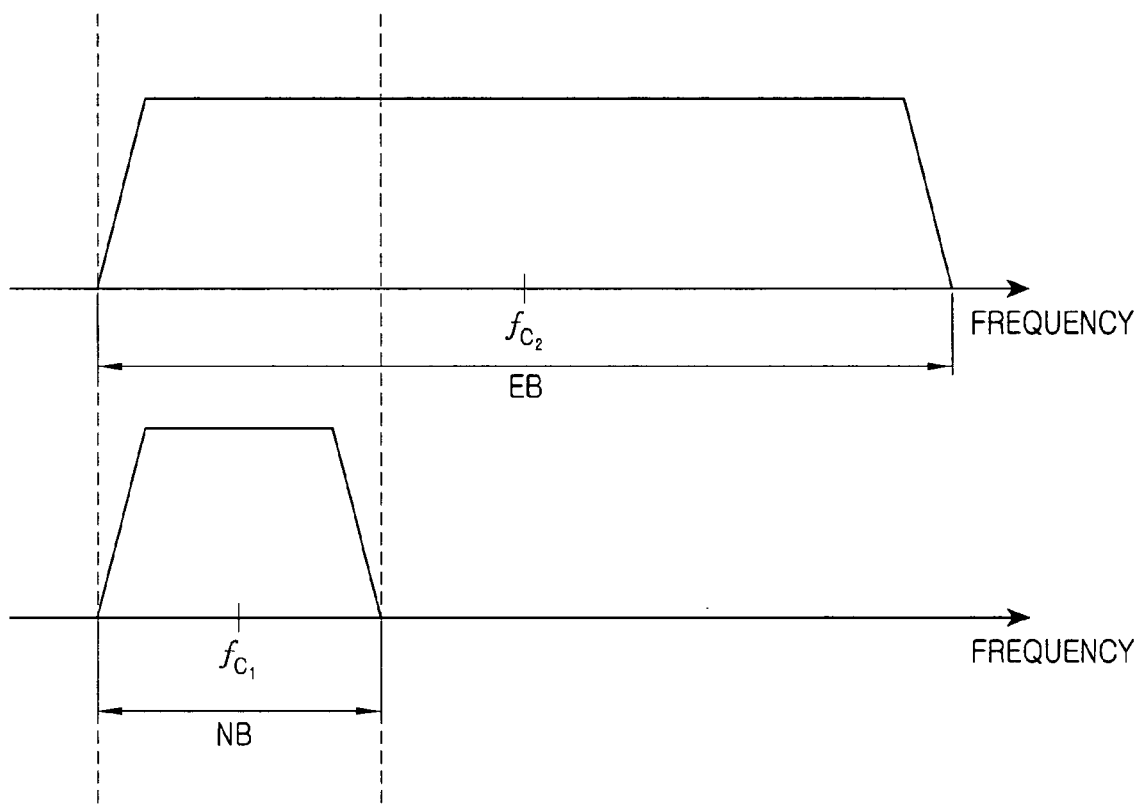
FIG. 1 is a diagram illustrating a frequency allocation operation in a frequency overlay communication system according to the present invention.

FIG. 1 is a diagram illustrating a frequency allocation operation in a frequency overlay communication system according to the present invention.

It will be assumed in FIG. 1 that the communication system previously installed before the illustrated frequency overlay communication system is designed, i.e., a non-frequency overlay communication system, already uses a carrier frequency $f_{c1}$ and its associated frequency band.

For convenience, the non-frequency overlay communication system will be referred to as an NB communication system and the frequency overlay communication system will be referred to as an EB communication system. Herein, the non-frequency overlay communication system is referred to as an NB communication system because a frequency band used in the non-frequency overlay communication system is relatively narrower than a frequency band used in the frequency overlay communication system. This does not mean that the frequency band used in the non-frequency overlay communication system is absolutely narrow.

If the types of services intended to be provided in the NB communication system are diversified and the required throughput increases, the NB communication system should extend a bandwidth of its frequency band in use. Therefore, a communication system, the bandwidth of whose frequency band in use is extended, can be taken into consideration, and the communication system with the extended bandwidth of its frequency band in use can be designed such that it is overlaid with the NB communication system in a frequency band. The communication system, whose frequency band in use is determined in such a scheme that it is overlaid with the NB communication system in the frequency band, is a frequency overlay communication system, i.e., an EB communication system. Application of the frequency overlay communication system is taken into consideration for the following purposes.

(1) For Reduction in License Cost for Frequency Band

The license cost occurring because of the extension of the required frequency band greatly increases due to limited frequency resources. The increase in the license cost for the frequency bands is a heavy burden on the service providers. Deployment of a frequency band different from a frequency band used in the NB communication system, not using the frequency overlay communication system, causes additional license cost for frequency bands, such as a case where a new NB communication system uses a new frequency band. However, the use of the frequency overlay communication system only involves the additional license cost for the additional bandwidth increases. As a result, the burden of license costs for frequency bands on the service providers decreases because they are allowed to bear only the additional license cost.

(2) For Increase in Frequency Resource Efficiency in Overlay Frequency Band

The use of the frequency overlay communication system illustrated in FIG. 1 increases frequency resource efficiency in the overlaid frequency band. One of the factors for determining performance of the general communication system is frequency efficiency, and the frequency efficiency is also very important for the service providers because the service providers can benefit from their subscribers in proportion to the frequency resource efficiency.

Generally, an increase in the number of subscribers available in a particular frequency band can acquire a scheduling gain, which is called a multiuser diversity gain. Therefore, when the frequency overlay communication system is used, the overlay frequency band is shared not only by the subscribers of the NB communication system, but also by the subscribers of the EB communication system, resulting in an increase in the number of subscribers available in the overlay frequency band. This contributes to an increase in the frequency resource efficiency. A specific increment in the frequency resource efficiency differs according to a scheduling scheme of a scheduler used in the EB communication system, and it is preferable to use a scheduling scheme that maximizes the frequency resource efficiency.

Figure 2:
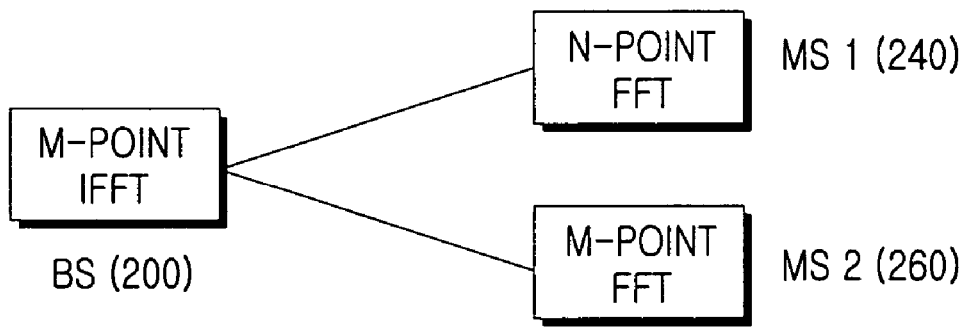
FIG. 2 is a diagram illustrating an exemplary transceiver module used in an EB communication system according to the present invention.

FIG. 2 is a diagram illustrating a preferred transceiver module used in an EB communication system according to the present invention.

It is assumed in FIG. 2 that the number of Inverse Fast Fourier Transform(IFFT)/Fast Fourier Transform(FFT) points of a transceiver module used in a communication system before a bandwidth of its frequency band in use is extended, i.e., an NB communication system, is N, and the number of IFFT/FFT points of a transceiver module used in a communication system after a bandwidth of its frequency band in use is extended, i.e., an EB communication system, is M (where M>N).

In this case, a base station (BS) 200 can support services to a mobile station (MS), i.e., an MS1 240, of the NB communication system and an MS, i.e., an MS2 260, of the EB communication system simply with an M-point IFFT/FFT module without separately including an N-point IFFT/FFT module. In order to support services to the MSs of both the NB communication system and the EB communication system simply with one IFFT/FFT module, i.e., the M-point IFFT/FFT module, in this way, a guard band can be provided between boundary frequency bands of the NB communication system and the EB communication system. A specific size of such a guard band depends upon performance of a band-pass filter (BPF).

Figure 3:
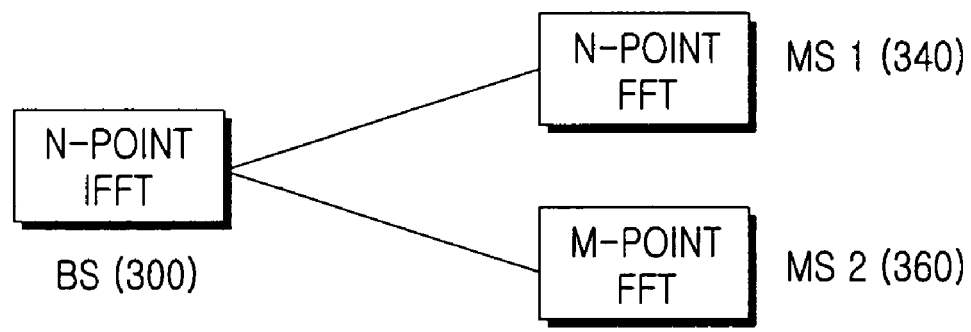
FIG. 3 is a diagram illustrating an alternative exemplary transceiver module used in an EB communication system according to the present invention.

FIG. 3 is a diagram illustrating an alternative exemplary transceiver module used in an EB communication system according to the present invention.

Similarly, it is assumed in FIG. 3 that the number of IFFT/FFT points of a transceiver module used in the NB communication system is N, and the number of IFFT/FFT points of a transceiver module used in the EB communication system is M (where M>N).

On the contrary, however, when the system is extended, BSs using the frequency overlay communication system may be deployed in such a way that in a particular region, BSs using the frequency overlay communication system cannot be deployed and only the BSs not using the frequency overlay scheme can be deployed. For convenience, in the following description, the BS using the frequency overlay communication system will be referred to as an 'EB-BS', and the BS not using the frequency overlay communication system will be referred to as an 'NB-BS'.

Of course, after the system extension is completed, there is almost no case where only the NB-BSs are deployed in a particular region. However, in the course of the system extension, such cases inevitably occur. Therefore, unlike the BS of FIG. 2, the BS of FIG. 3, if it is an NB-BS, should take into account even the IFFT/FFT points of the transceiver module used in the EB communication system.

The BS 300 uses only an N-point IFFT/FFT module, because it is an NB-BS as stated above. As described with reference to FIG. 2, if there is only a guard band between the frequency band used in the EB communication system and the frequency band used in the NB communication system, the NB-BS 300 can communicate not only with an MS1 340 having an N-point IFFT/FFT module but also with an MS2 360 having an M-point IFFT/FFT module, using only the N-point IFFT/FFT module. Also, as described with reference to FIG. 2, a specific size of such a guard band depends upon performance of a BPF.

Figure 4:
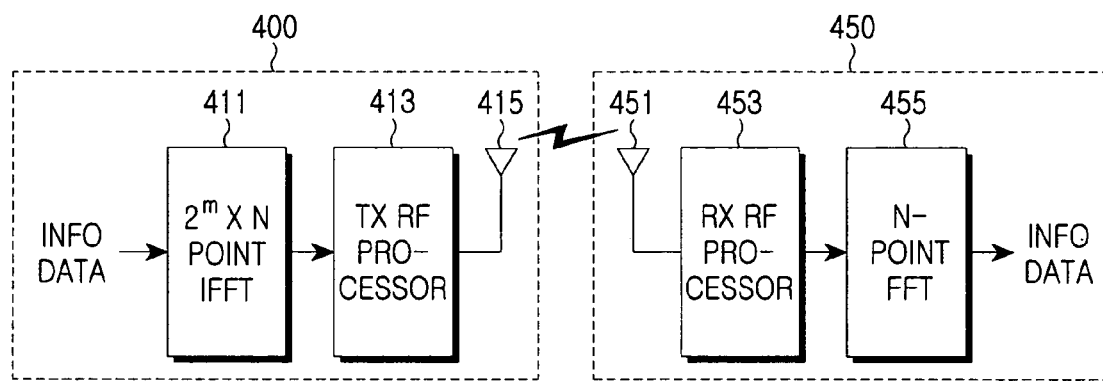
FIG. 4 is a diagram illustrating a downlink signal transmission/reception operation in the case where a bandwidth of an EB communication system is $2^m$ times a bandwidth of an NB communication system according to the present invention.

FIG. 4 is a diagram illustrating a downlink signal transmission/reception operation in the case where a bandwidth of an EB communication system is $2^m$ times a bandwidth of an NB communication system according to the present invention.

Referring to FIG. 4, the EB communication system includes a BS 400 and an MS 450. The BS 400 includes an $2^m \times N$-point IFFT module 411, a transmission radio frequency(RF) processor 413, and a transmission antenna 415, and the MS 450 includes a reception antenna 451, a reception RF processor 453, and an N-point FFT module 455. In the downlink signal transmission/reception operation, the BS 400 serves as a transmitter for transmitting the downlink signal, and the MS 450 serves as a receiver for receiving the downlink signal.

If there is information data to be transmitted from the BS 400 to the MS 450, the information data is delivered to the $2^m \times N$-point IFFT module 411. The information data was previously coded through channel coding, and the channel coding operation is not directly related to the present invention, so a detailed description thereof will be omitted. In addition, the information data includes not only traffic data but also control data. The control data includes position data of resources to which traffic data of each user, i.e., each MS, is mapped. It is assumed that resource positions for traffic data mapping of each MS are allocated such that the resource positions are disjoint from each other.

The $2^m \times N$-point IFFT module 411 performs $2^m \times N$-point IFFT on the input information data, and outputs the resultant signal to the transmission RF processor 413. It will be assumed herein that because the MS 450 can receive the downlink signal, the information data is mapped only to N input points among $2^m \times N$ input points of the $2^m \times N$-point IFFT module 411. The transmission RF processor 413 performs a transmission RF process on the signal output from the $2^m \times N$-point IFFT module 411, i.e., up-converts the signal to a carrier frequency $f_{c2}$ used in the EB communication system and then filters the up-converted signal through a BPF taking into account a bandwidth $W_{EB}$ used in the EB communication system, and transmits the RF-processed signal to the MS 450 via the transmission antenna 415.

The signal transmitted by the BS 400 is received at the MS 450 via the reception antenna 451, and the received signal is delivered to the reception RF processor 453. The reception RF processor 453 performs a reception RF process on the received signal, i.e., down-coverts the received signal to a base band, filters the down-converted signal through a BPF according to a frequency bandwidth $W_{NB}$ used in the NB communication system, and outputs the RF-processed signal to the N-point FFT module 455. By filtering the received signal through the BPF according to the frequency bandwidth $W_{NB}$ used in the NB communication system, the MS 450 can demodulate the signal transmitted by the BS 400 using the $2^m \times N$-point IFFT module 411, through the N-point FFT module 455. The N-point FFT module 455 performs N-point FFT on the signal output from the reception RF processor 453, thereby restoring the received signal to the original information data. Thereafter, the MS 450 recovers the actual traffic data targeting the MS 450 itself according to the control data in the information data.

A detailed description will now be made of the reason that for m=1, the signal that underwent 2N-point IFFT through a 2N-point IFFT module is band-pass-filtered through a BPS, and the IFFT-processed signal can be demodulated by undergoing N-point FFT through an N-point FFT module.

If there is information data in a BS, the information data is expressed as a signal in a frequency domain as shown in Equation (1) below.

$$X(k) = X_{NB}(k), 0 \leq k \leq N-1, X_{EB}(k), N \leq k \leq 2N-1. \qquad (1)$$

In Equation (1), $X_{NB}(k)$ denotes a signal in the frequency domain of an NB communication system for $0 \leq k \leq N-1$, and $X_{EB}(k)$ denotes a signal in the frequency domain of an EB communication system for $N \leq k < 2N-1$. In addition, k denotes an input point index of an IFFT module. Because it is assumed in Equation (1) that the IFFT module is a 2N-point IFFT module, if k satisfies a condition of $0 \leq k \leq 2N-1$, an input point index of the 2N-point IFFT module increases one by one from 0, reaching the final input point of 2N-1.

The X(k) is expressed as a signal in the time domain as shown in Equation (2), if it undergoes 2N-point IFFT through the 2N-point IFFT module.

$$x(n) = \frac{1}{2N} \sum_{k=0}^{2N-1} X(k) e^{j\frac{2\pi}{N}kn}, \frac{1}{2N} \sum_{k=0}^{N-1} \left( X_{NB}(k) + X_{EB}(k) e^{j2\pi \frac{n}{2}} \right) e^{j\frac{2\pi}{N}\frac{kn}{2}} \qquad (2)$$

In Equation (2), x(n) denotes a signal in the time domain obtained as the X(k) undergoes 2N-point IFFT through the 2N-point IFFT module.

If the BS transmits the signal of Equation (2), an MS receives the signal transmitted by the transmitter, and filters the received signal through a BPF according to a frequency bandwidth $W_{NB}$ of the NB communication system, and the filtered signal in the time domain can be represented by $$x^{BPF}(n) = BPF(x(n)) = \frac{1}{2N} \sum_{k=0}^{N-1} X_{NB}(k) e^{j\frac{2\pi}{N}\frac{kn}{2}} \qquad (3)$$

In Equation (3), $x^{BPF}(n)$ denotes a signal obtained by filtering the signal x(n) in the time domain transmitted by the BS, through the BPF.

If the MS performs N-point FFT on the received signal through the N-point FFT module without filtering the received signal through the BPF according to the frequency bandwidth $W_{NB}$ of the NB communication system, the signal in the frequency domain after undergoing the N-point FFT can be expressed as $$Y(k) = \frac{1}{2}(X_{NB}(k) + X_{EB}(k)) \qquad (4)$$

In Equation (4), Y(k) denotes a signal in the frequency domain obtained as the received signal undergoes N-point FFT through the N-point FFT module. If the received signal undergoes N-point FFT through the N-point FFT module without being filtered through the BPF, according to the frequency bandwidth $W_{NB}$ of the NB communication system as shown in Equation (4), the resultant signal includes not only the signal $X_{NB}(k)$, desired by the MS, but also an interference signal $X_{EB}(k)$.

Otherwise, if the signal $x^{BPF}(n)$ that is filtered through a BPF according to the frequency bandwidth $W_{NB}$ of the NB communication system undergoes N-point FFT through the N-point FFT module, the resultant signal includes only the signal $X_{NB}(k)$ desired by the MS as shown in Equation (5).

$$Y^{BPF}(k) = FFT(x^{BPF}(n)) \qquad (5)$$
$$= \frac{1}{2} X_{NB}(k)$$

In Equation (5), $Y^{BPF}(k)$ denotes a signal in the frequency domain obtained by performing N-point FFT on the $x^{BPF}(n)$ through the N-point FFT module.

As described above, it can be noted that even though the BS performs 2N-point IFFT on a signal through a 2N-point IFFT module before transmission and the MS performs N-point FFT on the received signal through an N-point FFT module, if a reception RF processor appropriately performs band-pass filtering through a BPF, it is possible to correctly demodulate the received signal.

Figure 5:
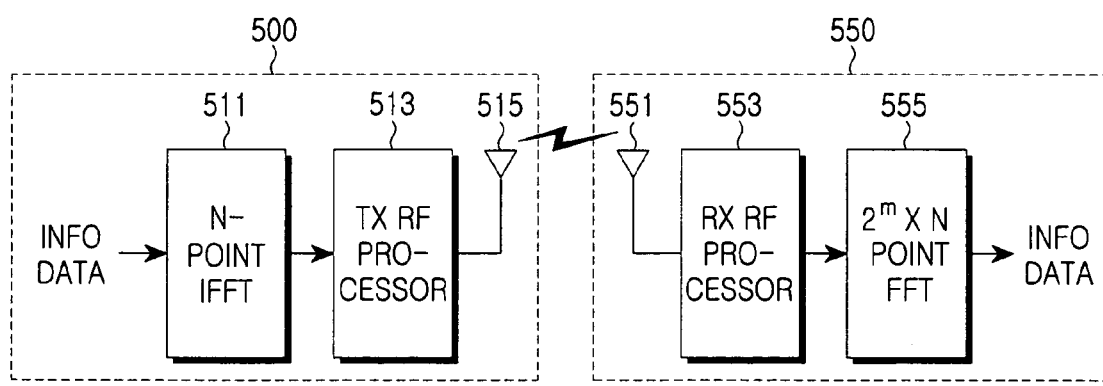
FIG. 5 is a diagram illustrating an uplink signal transmission/reception operation in the case where a bandwidth of an EB communication system is $2^m$ times a bandwidth of an NB communication system according to the present invention.

FIG. 5 is a diagram illustrating an uplink signal transmission/reception operation in the case where a bandwidth of an EB communication system is $2^m$ times a bandwidth of an NB communication system according to the present invention.

Referring to FIG. 5, the EB communication system includes an MS 500 and a BS 550. The MS 500 includes an N-point IFFT module 511, a transmission RF processor 513 and a transmission antenna 515, and the BS 550 includes a reception antenna 551, a reception RF processor 553, and a $2^m \times$N-point FFT module 555. In the uplink signal transmission/reception operation, the MS 500 serves as a transmitter for transmitting the uplink signal, and the BS 550 serves as a receiver for receiving the uplink signal.

If there is information data to be transmitted from the MS 500 to the BS 550, the information data is delivered to the N-point IFFT module 511. The information data was previously coded through channel coding, and the channel coding operation is not directly related to the present invention, so a detailed description thereof will be omitted. In addition, the information data includes not only traffic data but also control data. It is assumed that resource positions for traffic data mapping of each MS are allocated such that the resource positions are disjoint from each other.

The N-point IFFT module 511 performs N-point IFFT on the input information data, and outputs the resultant signal to the transmission RF processor 513. Because the MS 500 performs only the N-point IFFT on the information data before transmission, the $2^m \times$N-point FFT module 555 of the BS 550 receives actual information data only through N points among the $2^m \times$N points. The transmission RF processor 513 performs a transmission RF process on the signal output from the N-point IFFT module 511, i.e., up-converts the signal to a carrier frequency $f_{c2}$ used in the EB communication system, filters the up-converted signal through a BPF taking into account a bandwidth $W_{NB}$ used in the NB communication system, and transmits the RF-processed signal to the BS 550 via the transmission antenna 515.

The signal transmitted by the MS 500 is received at the BS 550 via the reception antenna 551, and the received signal is delivered to the reception RF processor 553. The reception RF processor 553 performs a reception RF process on the received signal, i.e., down-coverts the received signal to a base band, filters the down-converted signal through a BPF according to a frequency bandwidth $W_{EB}$ used in the EB communication system, and outputs the RF-processed signal to the $2^m \times$N-point FFT module 555. By filtering the received signal through the BPF according to the frequency bandwidth $W_{EB}$ used in the EB communication system, the BS 550 can demodulate the signal transmitted by the MS 500 using the N-point IFFT module 511, through the $2^m \times$N-point FFT module 555. The $2^m \times$N-point FFT module 555 performs $2^m \times$N-point FFT on the signal output from the reception RF processor 553, thereby restoring the received signal to the original information data.

A description will now be made of a signal transmission/reception operation in the case where a bandwidth of an EB communication system is not $2^m$ times a bandwidth of an NB communication system according to the present invention.

It will be assumed that the bandwidth of the EB communication system is not y times the bandwidth of the NB communication system, where $y \neq 2^m$. As described above, in the case where the bandwidth of the EB communication system is $2^m$ times the bandwidth of the NB communication system, it is possible to minimize complexity of the signal transmission/reception system using the IFFT/FFT module. However, in the case where the bandwidth of the EB communication system is not $2^m$ times the bandwidth of the NB communication system, it is basically impossible to use the IFFT/FFT module.

Because the use of the IFFT/FFT module is impossible, it is necessary to use an Inverse Discrete Fourier Transform (IDFT)/Discrete Fourier Transform (DFT) module rather than the IFFT/FFT module. The use of the IDFT/DFT module remarkably increases the complexity of the signal transmission/reception system. For example, if the complexity for the case where an N-point IFFT/FFT module is used is assumed to be $N \log_2 N$, the complexity for the case where an N-point IDFT/DFT module is used is $N^2$. Thus, it can be noted that when N is a very large number, the complexity difference is very large. Therefore, it is not preferable to use the IDFT/DFT module, in terms of the complexity, even for the case where the bandwidth of the EB communication system is not $2^m$ times the bandwidth of the NB communication system. Accordingly, the present invention proposes a signal transmission/reception scheme having the minimum complexity in the case where the bandwidth of the EB communication system is not $2^m$ times the bandwidth of the NBS communication system.

Figure 6:
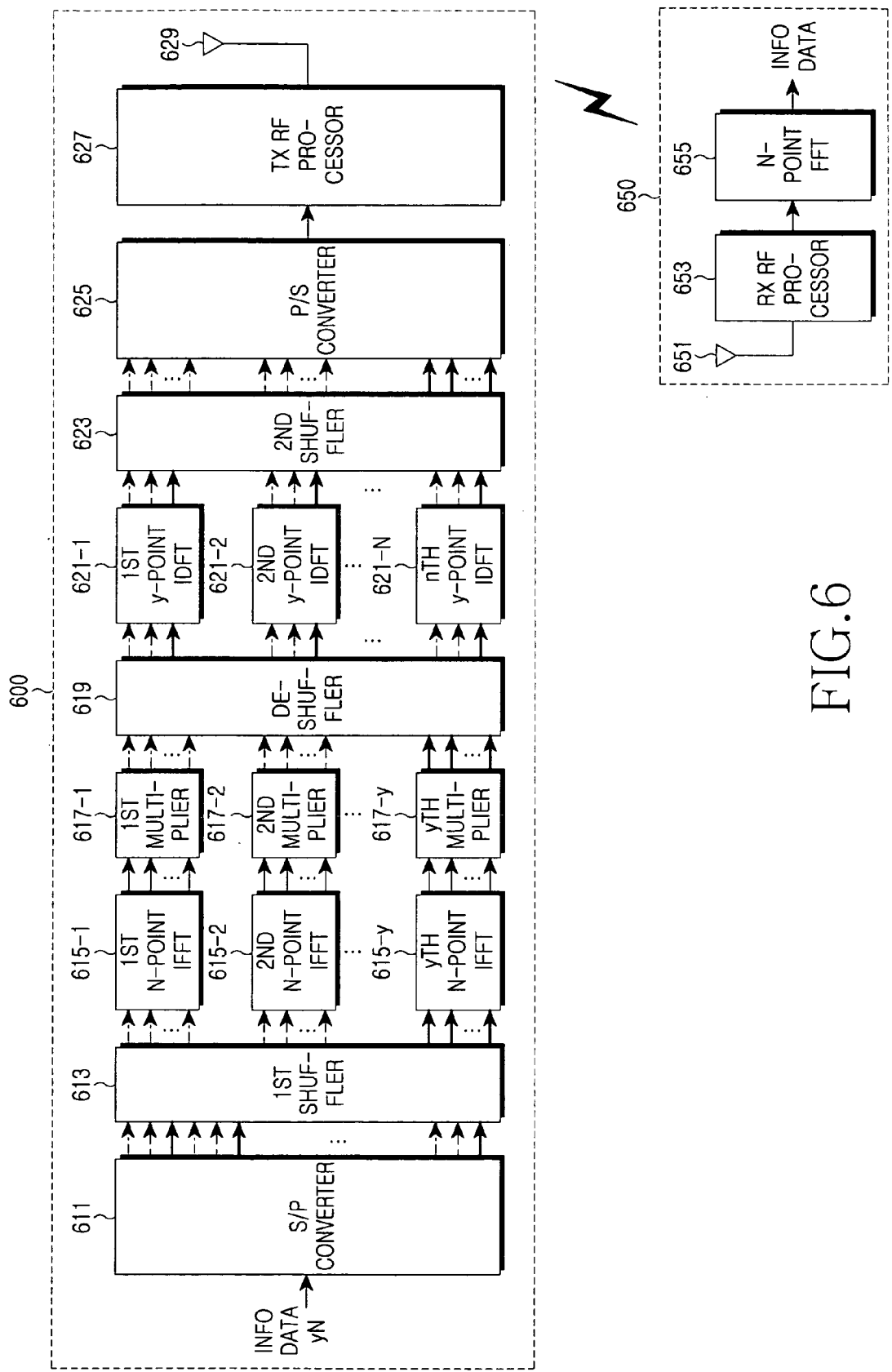
FIG. 6 is a diagram illustrating a downlink signal transmission/reception system in the case where a bandwidth of an EB communication system is y times ($y \neq 2^m$) a bandwidth of an NB communication system according to the present invention.

FIG. 6 is a diagram illustrating a downlink signal transmission/reception system in the case where a bandwidth of an EB communication system is y times ($y \neq 2^m$) a bandwidth of an NB communication system according to the present invention.

Referring to FIG. 6, the EB communication system includes a BS 600 and an MS 650. In the downlink signal transmission/reception operation, the BS 600 serves as a transmitter for transmitting the downlink signal, and the MS 650 serves as a receiver for receiving the downlink signal.

The BS 600 includes a serial-to-parallel (S/P) converter 611, a first shuffler 613, y N-point IFFT modules of a first N-point IFFT module 615-1 to an $y^{th}$ N-point IFFT module 615-y, y multipliers of a first multiplier 617-1 to a $y^{th}$ multiplier 617-y, a de-shuffler 619, N y-point IDFT modules of a first y-point IDFT module 621-1 to an $N^{th}$ y-point IDFT module 621-N, a second shuffler 623, a parallel-to-serial (P/S) converter 625, a transmission RF processor 627, and a transmission antenna 629. The MS 650 includes a reception antenna 651, a reception RF processor 653, and an N-point FFT module 655.

If there is information data with a length yN to be transmitted from the BS 600 to the MS 650, the information data is delivered to the S/P converter 611. The information data was previously coded through channel coding, and the channel coding operation is not directly related to the present invention, so a detailed description thereof will be omitted. In addition, the information data includes not only traffic data but also control data. The control data includes position data of resources to which traffic data of each user, i.e., each MS, is mapped. It is assumed that resource positions for traffic data mapping of each MS are allocated such that the resource positions are disjoint from each other.

The S/P converter 611 parallel-converts the information data with the length yN, and outputs the resultant signal to the first shuffler 613. The first shuffler 613 shuffles the signal output from the S/P converter 611 according to a first shuffling scheme, and outputs the resultant signal to corresponding N-point IFFT modules. The first shuffler 613 includes a total of yN input points, and the yN input points each have an input point index, which sequentially increases one by one from 0 to yN−1. The first shuffling scheme groups N signals having the same result value as the result obtained by performing a modulo-y operation on a signal received through each of the yN input points of the first shuffler 613 and an input point index of a corresponding input point, into y groups, and outputs the y group signals to corresponding N-point IFFT modules.

That is, the first shuffler 613 outputs N signals received through the input points corresponding to the input point indexes having the modulo-y operation result value of 0 to the first N-point IFFT module 615-1, outputs N signals received through the input points corresponding to the input point indexes having the modulo-y operation result value of 1 to the second N-point IFFT module 615-2, and in this scheme, outputs N signals received through the input points corresponding to the input point indexes having the modulo-y operation result value of y−1 to the $y^{th}$ N-point IFFT module 615-y.

The first N-point IFFT module 615-1 performs N-point IFFT on the signal output from the first shuffler 613, and outputs the resultant signal to the first multiplier 617-1. The first multiplier 617-1 multiplies the signal output from the first N-point IFFT module 615-1 by preset values, and outputs the resultant signal to the de-shuffler 619.

Similarly, the second N-point IFFT module 615-2 performs N-point IFFT on the signal output from the first shuffler 613, and outputs the resultant signal to the second multiplier 617-2. The second multiplier 617-2 multiplies the signal output from the second N-point IFFT module 615-2 by preset values, and outputs the resultant signal to the de-shuffler 619.

In this scheme, the $y^{th}$ N-point IFFT module 615-y, which is the last N-point IFFT module, performs N-point IFFT on the signal output from the first shuffler 613, and outputs the resultant signal to the $y^{th}$ multiplier 617-y. The $y^{th}$ multiplier 617-y multiplies the signal output from the $y^{th}$ N-point IFFT module 615-y by preset values, and outputs the resultant signal to the de-shuffler 619.

The de-shuffler 619 de-shuffles the signals output from the first multiplier 617-1 to the $y^{th}$ multiplier 617-y according to a predetermined de-shuffling scheme, and outputs the resultant signals to corresponding y-point IDFT modules. The de-shuffler 619 includes a total of yN output points, and the yN output points each have an output point index, which sequentially increases one by one from 0 to yN−1. The de-shuffling scheme outputs each of the signals output from the first multiplier 617-1 to the y multiplier 617-y to output points of the de-shuffler 619 that have the same index as the input point index of the first shuffler 613. That is, the de-shuffler 619 de-shuffles the signals output from the first multiplier 617-1 to the $y^{th}$ multiplier 617-y, and outputs corresponding signals to the first y-point IDFT module 621-1 to the $N^{th}$ y-point IDFT module 621-N through corresponding output points of the de-shuffler 619. In other words, the de-shuffler 619 sequentially groups y signals into N groups and outputs the N group signals from the first y-point IDFT module 621-1 to the $N^{th}$ y-point IDFT module 621-N through the output points corresponding to the output point indexes having the same values as the input point indexes at the first shuffler 613 of the corresponding signals.

The first y-point IDFT module 621-1 performs y-point IDFT on the signal output from the de-shuffler 619, and outputs the resultant signal to the second shuffler 623. The second y-point IDFT module 621-2 performs y-point IDFT on the signal output from the de-shuffler 619, and outputs the resultant signal to the second shuffler 623. In this scheme, the $N^{th}$ y-point IDFT module 621-N, which is the last y-point IDFT module, performs y-point IDFT on the signal output from the de-shuffler 619, and outputs the resultant signal to the second shuffler 623.

The second shuffler 623 shuffles the signals output from the first y-point IDFT module 621-1 to the $N^{th}$ y-point IDFT module 621-N according to a second shuffling scheme, and outputs the resultant signals to the P/S converter 625. The second shuffler 623 includes a total of yN input points, and the yN input points each have an input point index, which sequentially increases one by one from 0 to yN−1. The second shuffling scheme groups N signals having the same result value as the result obtained by performing a modulo-N operation on a signal received through each of the yN input points of the second shuffler 623, and an input point index of a corresponding input point, into y groups, and sequentially outputs the y group signals to the P/S converter 625.

The P/S converter 625 serial-converts the signals output from the second shuffler 623, and outputs the resultant signal to the transmission RF processor 627. The transmission RF processor 627 is equal in operation to the transmission RF processor 413 described with reference to FIG. 4, so a detailed description thereof will be omitted.

The signal transmitted by the BS 600 is received at the MS 650 via the reception antenna 651, and the received signal is delivered to the reception RF processor 653. The reception RF processor 653 performs a reception RF process on the received signal, i.e., down-coverts the received signal to a base band, filters the down-converted signal through a BPF according to a frequency bandwidth $W_{NB}$ used in the NB communication system, and outputs the RF-processed signal to the N-point FFT module 655. By filtering the received signal through the BPF according to the frequency bandwidth $W_{NB}$ used in the NB communication system, the MS 650 can demodulate the signal transmitted by the BS 600 through the N-point FFT module 655, and the N-point FFT module 655 performs N-point FFT on the signal output from the reception RF processor 653, thereby restoring the received signal to the original information data. Thereafter, the MS 650 recovers the actual traffic data targeting the MS 650 itself according to the control data in the information data.

A detailed description will now be made of the reason that downlink transmission/reception is possible in the downlink signal transmission/reception system in the case where the bandwidth of the EB communication system is y times ($y \neq 2^m$) the bandwidth of the NB communication system, as shown in FIG. 6.

A signal in the time domain, after undergoing yN-point IDFT, can be represented by $$x(n) = \frac{1}{yN} \sum_{k=0}^{yN-1} X(k) e^{j\frac{2\pi}{yN}kn} \quad (6)$$

In Equation (6), x(n) denotes a signal in the time domain after undergoing yN-point IDFT. If the x(n) shown in Equation (6) is substituted by $k = yk_1 + k_2$ ($0 \leq k_1 \leq N-1$, $0 \leq k_2 \leq y-1$) and $n = Nn_1 + n_2$ ($0 \leq n_1 \leq y-1$, $0 \leq n_2 \leq N-1$), then $$x(n) = \frac{1}{yN} \sum_{k=0}^{yN-1} X(k) e^{j\frac{2\pi}{N}kn} \quad (7)$$
$$= \frac{1}{yN} \sum_{k_2=0}^{y-1} \sum_{k_1=0}^{N-1} X(yk_1 + k_2) e^{j\frac{2\pi}{yN}(yk_1+k_2)(Nn_1+n_2)}$$
$$= \frac{1}{y} \sum_{k_2=0}^{y-1} \left[ \sum_{k_1=0}^{N-1} \frac{1}{N} X(yk_1 + k_2) e^{j\frac{2\pi}{N}k_1 n_2} \right] \left[ e^{j\frac{2\pi}{yN}k_1 n_2} \right] e^{j\frac{2\pi}{N}k_2 n_1}$$

It can be noted from Equation (7) that the signal x(n) in the time domain, after undergoing yN-point IDFT, is expressed as the signal that passed through y N-point IFFT modules, y multipliers, and N y-point IDFT modules.

Therefore, the downlink signal transmission/reception with the lowest complexity is possible even in the case where the bandwidth of the EB communication system is y times ($y \neq 2^m$) the bandwidth of the NB communication system as described in connection with FIG. 6.

Figure 7:
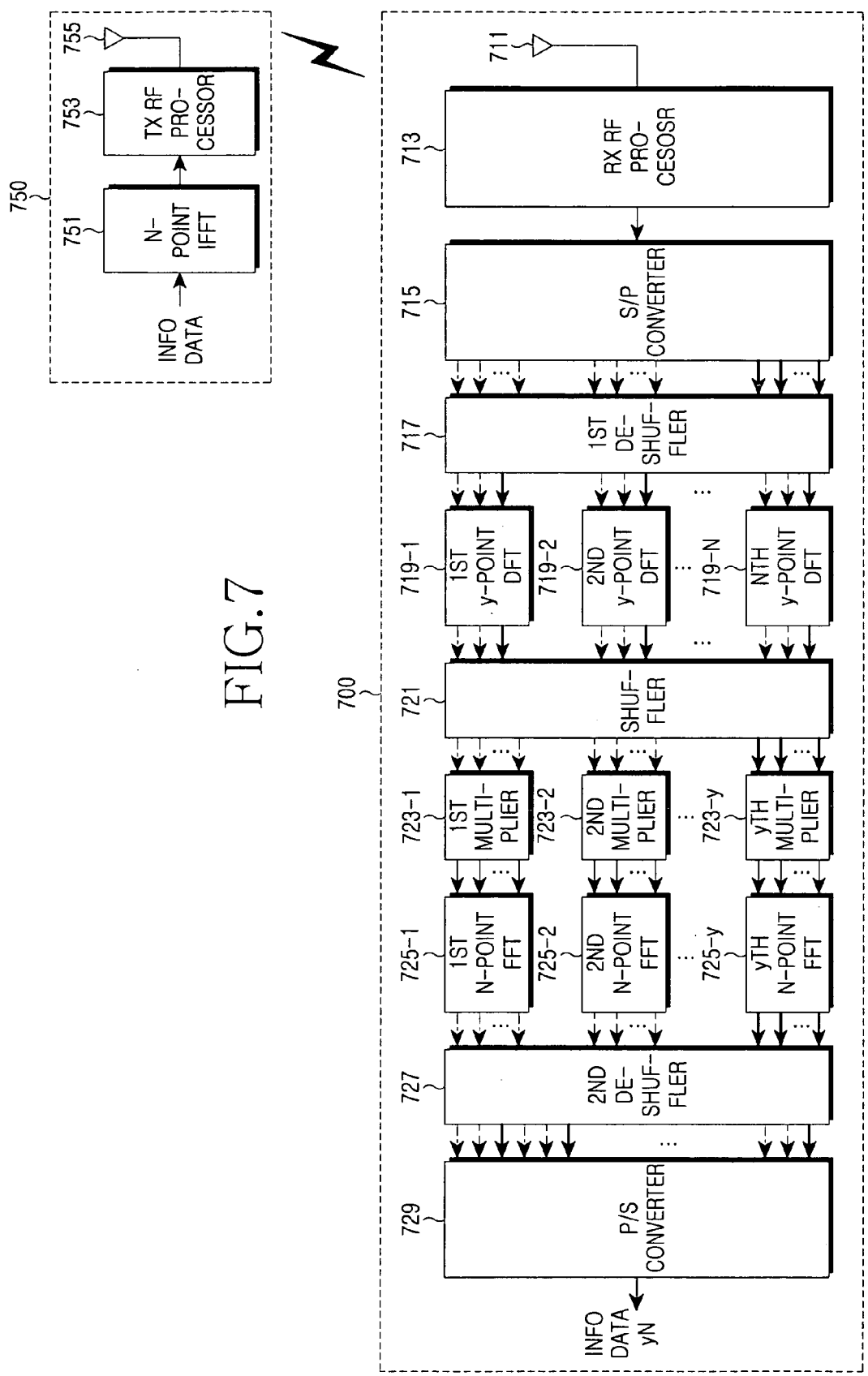
FIG. 7 is a diagram illustrating a structure of an uplink signal transmission/reception system in the case where a bandwidth of an EB communication system is y times ($y \neq 2^m$) a bandwidth of an NB communication system according to the present invention.

FIG. 7 is a diagram illustrating a structure of an uplink signal transmission/reception system in the case where a bandwidth of an EB communication system is y times ($y \neq 2^m$) a bandwidth of an NB communication system according to the present invention.

Referring to FIG. 7, the EB communication system includes a BS 700 and an MS 750. In the uplink signal transmission/reception operation, the BS 700 serves as a receiver for receiving the uplink signal, and the MS 750 serves as a transmitter for transmitting the uplink signal.

The BS 700 includes a reception antenna 711, a reception RF processor 713, an S/P converter 715, a first de-shuffler 717, N y-point DFT modules of a first y-point DFT module 719-1 to an $N^{th}$ y-point DFT module 719-N, a shuffler 721, y multipliers of a first multiplier 723-1 to a $y^{th}$ multiplier 723-y, y N-point FFT modules of a first N-point FFT module 725-1 to a $y^{th}$ N-point FFT modules 725-y, a second de-shuffler 727, and a P/S converter 729. The MS 750 includes an N-point IFFT module 751, a transmission RF processor 753, and a transmission antenna 755.

If there is information data to be transmitted from the MS 750 to the BS 700, the information data is delivered to the N-point IFFT module 751. The information data was previously coded through channel coding, and the channel coding operation is not directly related to the present invention, so a detailed description thereof will be omitted. In addition, the information data includes not only traffic data but also control data. It is assumed that resource positions for traffic data mapping of each MS are allocated such that the resource positions are disjoint from each other.

The N-point IFFT module 751 performs N-point IFFT on the input information data, and outputs the resultant signal to the transmission RF processor 753. Because the MS 750 performs only the N-point IFFT on the information data before transmission, the BS 700 receives actual information data only through the N points. The transmission RF processor 753 performs a transmission RF process on the signal output from the N-point IFFT module 751, i.e., up-converts the signal to a carrier frequency $f_{c2}$ used in the EB communication system, filters the up-converted signal through a BPF taking into account a bandwidth $W_{NB}$ used in the NB communication system, and transmits the RF-processed signal to the BS 700 via the transmission antenna 755.

The signal transmitted by the MS 750 is received at the BS 700 via the reception antenna 711, and the received signal is delivered to the reception RF processor 713. The reception RF processor 713 performs a reception RF process on the received signal, i.e., down-coverts the received signal to a base band, filters the down-converted signal through a BPF according to a frequency bandwidth $W_{EB}$ used in the EB communication system, and outputs the RF-processed signal to the S/P converter 715. The S/P converter 715 parallel-converts the signal output from the reception RF processor 713, and outputs the resultant signal to the first de-shuffler 717. The first de-shuffler 717 de-shuffles the signal output from the S/P converter 715 according to a first de-shuffling scheme, and outputs the resultant signal to corresponding y-point DFT modules. The first de-shuffler 717 includes a total of yN output points, and the yN output points each have an output point index, which sequentially increases one by one from 0 to yN−1. The first de-shuffling scheme is as follows. Of yN inputs, N inputs are mapped to a first part of a DFT input in the next stage. Because there are N y-point DFT modules, the final N inputs are input in such a scheme that one input is input to a first part of each DFT input. Next, N data units of a data unit N+1 to a data unit 2N are mapped to a second part in the DFT input. In this way, finally, N data units of a data unit (y−1)*N+1 to a data unit yN are sequentially mapped to the last part in the DFT input.

The first y-point DFT module 719-1 performs y-point DFT on the signal output from the first de-shuffler 717, and outputs the resultant signal to the shuffler 721. The second y-point DFT module 719-2 performs y-point DFT on the signal output from the first de-shuffler 717, and outputs the resultant signal to the shuffler 721. In this scheme, the $N^{th}$ y-point DFT module 719-N, which is the last y-point DFT module, performs y-point DFT on the signal output from the first de-shuffler 717, and outputs the resultant signal to the shuffler 721.

The shuffler 721 shuffles the signals output from the first y-point DFT module 719-1 to the $N^{th}$ y-point DFT module 719-N according to a shuffling scheme, and outputs the resultant signals to corresponding multipliers. The shuffler 721 includes a total of yN input points, and the yN input points each have an input point index, which sequentially increases one by one from 0 to yN−1. The shuffling scheme groups N signals having the same result value as the result obtained by performing a modulo-y operation on a signal received through each of the yN input points of the shuffler 721, and an input point index of a corresponding input point, into y groups, and outputs the y group signals to corresponding multipliers.

That is, the shuffler 721 performs a modulo-y operation on the signals output from the first y-point DFT module 719-1 to the $N^{th}$ y-point DFT module 719-N, outputs N signals received through the input points corresponding to the input point indexes having a modulo-y operation result value of 0 to the first multiplier 723-1, outputs N signals received through the input points corresponding to the input point indexes having a modulo-y operation result value of 1 to the second multiplier 723-2, and in this scheme, outputs N signals received through the input points corresponding to the input point indexes having a modulo-y operation result value of y−1 to the $y^{th}$ multiplier 723-y.

The first multiplier 723-1 multiplies the signal output from the shuffler 721 by preset values, and outputs the resultant signal to the first N-point FFT module 725-1. The second multiplier 723-2 multiplies the signal output from the shuffler 721 by preset values, and outputs the resultant signal to the second N-point FFT module 725-2. In the same scheme, the $y^{th}$ multiplier 723-y, which is the last multiplier, multiplies the signal output from the shuffler 721 by preset values, and outputs the resultant signal to the $y^{th}$ N-point FFT module 725-y.

The first N-point FFT module 725-1 performs N-point FFT on the signal output from the first multiplier 723-1, and outputs the resultant signal to the second de-shuffler 727. The second N-point FFT module 725-2 performs N-point FFT on the signal output from the second multiplier 723-2, and outputs the resultant signal to the second de-shuffler 727. In this scheme, the $y^{th}$ N-point FFT module 725-y, which is the last N-point FFT module, performs N-point FFT on the signal output from the $y^{th}$ multiplier 723-y, and outputs the resultant signal to the second de-shuffler 727.

The second de-shuffler 727 de-shuffles the signals output from the first N-point FFT module 725-1 to the $y^{th}$ N-point FFT module 725-y according to a second de-shuffling scheme, and outputs the resultant signals to the P/S converter 729. The second de-shuffler 727 includes a total of yN output points, and the yN output points each have an output point index, which sequentially increases one by one from 0 to yN−1. The second de-shuffling scheme outputs the signals output from the first N-point FFT module 725-1 to the $y^{th}$ N-point FFT module 725-y to the output points of the second de-shuffler 727 that have the same indexes as the output point indexes of the first de-shuffler 717. That is, the second de-shuffler 727 de-shuffles the signals output from the first N-point FFT module 725-1 to the $y^{th}$ N-point FFT module 725-y, and outputs corresponding signals to the P/S converter 729 through corresponding output points of the second de-shuffler 727. In other words, the second de-shuffler 727 sequentially maps the corresponding signals to the output points corresponding to the output point indexes having the same values as the output point indexes in the first de-shuffler 717 and outputs the resultant signals to the P/S converter 729.

The P/S converter 729 serial-converts the signal output from the second de-shuffler 727, recovering the information data.

A detailed description will now be made of the reason that uplink transmission/reception is possible in the uplink signal transmission/reception system in the case where the bandwidth of the EB communication system is y times ($y \ne 2^m$) the bandwidth of the NB communication system, as shown in FIG. 7.

A signal in the frequency domain, after undergoing yN-point DFT, is defined as $$X(k) = \sum_{n=0}^{yN-1} x(n)e^{-j\frac{2\pi}{yN}kn} \qquad (8)$$

In Equation (8), X(k) denotes a signal in the frequency domain, after undergoing yN-point DFT. If the X(k) shown in Equation (8) is substituted by $k=yk_1+k_2$ ($0 \le k_1 \le N-1$, $0 \le k_2 \le y-1$) and $n=Nn_1+n_2$ ($0 \le n_1 \le y-1$, $0 \le n_2 \le N-1$), then $$\begin{aligned} X(k) &= \sum_{n=0}^{yN-1} X(n)e^{-j\frac{2\pi}{yN}kn} \\ &= \sum_{n_2=0}^{N-1} \sum_{n_1=0}^{y-1} x(Nn_1+n_2)e^{-j\frac{2\pi}{yN}(yk_1+k_2)(Nn_1+n_2)} \\ &= \sum_{n_2=0}^{N-1} \left[ \sum_{n_1=0}^{y-1} x(Nn_1+n_2)e^{-j\frac{2\pi}{y}k_2 n_1} \right] \left[ e^{-j\frac{2\pi}{yN}k_2 n_2} \right] e^{-j\frac{2\pi}{N}k_1 n_2} \end{aligned} \qquad (9)$$

It can be noted from Equation (9) that the signal X(k) in the frequency domain, after undergoing yN-point DFT, is expressed as the signal that passed through y N-point FFT modules, y multipliers, and N y-point DFT modules.

Therefore, the uplink signal transmission/reception with the lowest complexity is possible even in the case where the bandwidth of the EB communication system is y times ($y \ne 2^m$) the bandwidth of the NB communication system.

Figure 8:
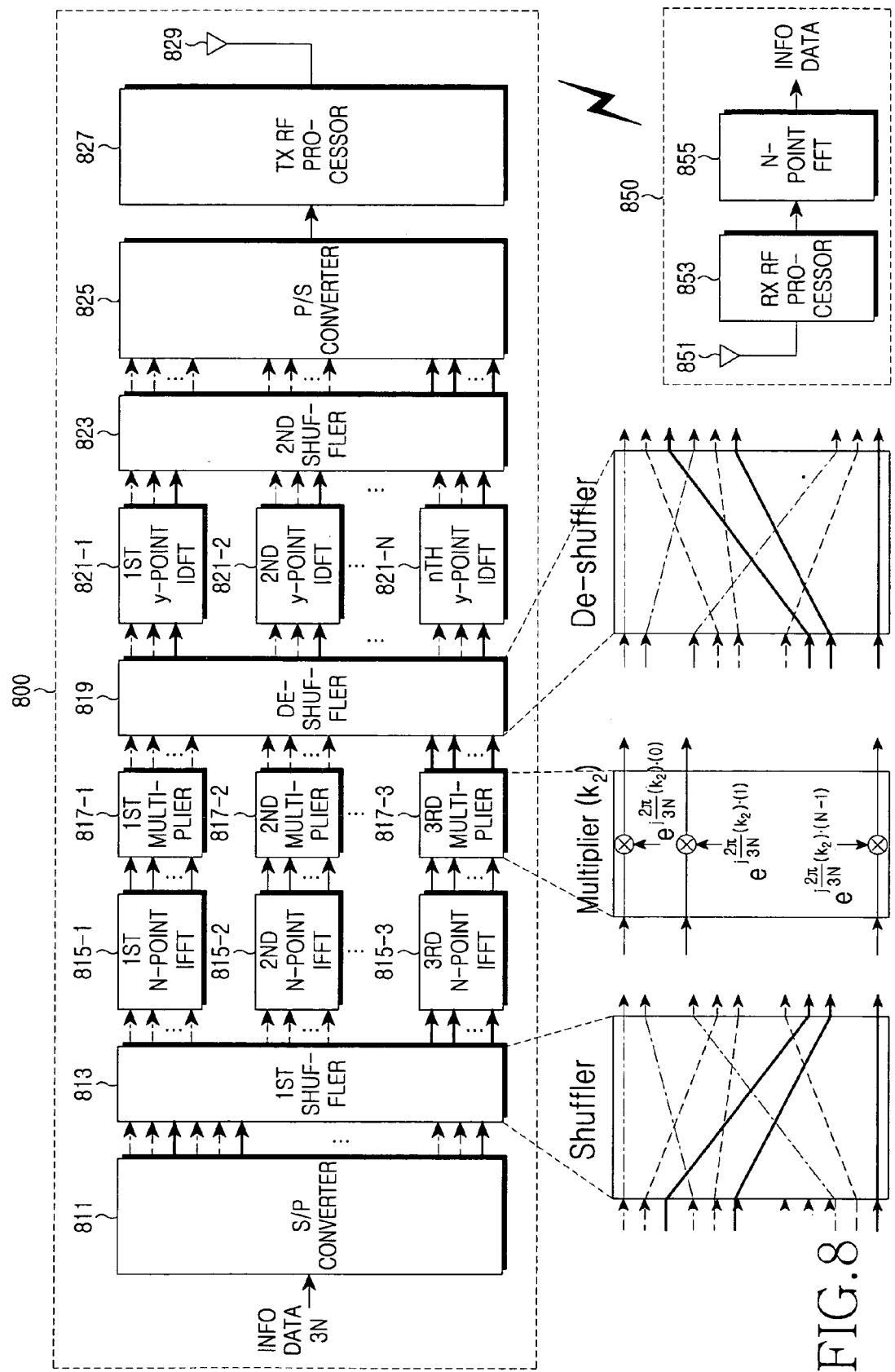
FIG. 8 is a diagram illustrating a downlink signal transmission/reception system in the case where a bandwidth of an EB communication system is 3 times a bandwidth of an NB communication system according to the present invention.

FIG. 8 is a diagram illustrating a downlink signal transmission/reception system in the case where a bandwidth of an EB communication system is, for example, 3 times a bandwidth of an NB communication system according to the present invention.

Referring to FIG. 8, the EB communication system includes a BS 800 and an MS 850. In the downlink signal transmission/reception operation, the BS 800 serves as a transmitter for transmitting the downlink signal, and the MS 850 includes a receiver for receiving the downlink signal.

The BS 800 includes an S/P converter 811, a first shuffler 813, 3 N-point IFFT modules of a first N-point IFFT module 815-1 to the third N-point IFFT module 815-3, 3 multipliers of a first multiplier 817-1 to the third 3 multiplier 817-3, a de-shuffler 819, N 3-point IDFT modules of a first 3-point IDFT module 821-1 to an $N^{th}$ 3-point IDFT module 821-N, a second shuffler 823, a P/S converter 825, a transmission RF processor 827, and a transmission antenna 829. The MS 850 includes a reception antenna 851, a reception RF processor 853, and an N-point FFT module 855.

If there is information data with a length 3N to be transmitted from the BS 800 to the MS 850, the information data is delivered to the S/P converter 811. The information data was previously coded through channel coding, and the channel coding operation is not directly related to the present invention, so a detailed description thereof will be omitted. In addition, the information data includes not only traffic data but also control data. The control data includes position data of resources to which traffic data of each user, i.e., each MS, is mapped. It is assumed that resource positions for traffic data mapping of each MS are allocated such that the resource positions are disjoint from each other.

The S/P converter 811 parallel-converts the length-3N information data, and outputs the resultant signal to the first shuffler 813. The first shuffler 813 shuffles the signal output from the S/P converter 811 according to a first shuffling scheme, and outputs the resultant signal to corresponding N-point IFFT modules. The first shuffler 813 includes a total of 3N input points, and the 3N input points each have an input point index, which sequentially increases one by one from 0 to 3N−1. The first shuffling scheme groups N signals having the same result value as the result obtained by performing a modulo-3 operation on a signal received through each of the 3N input points of the first shuffler 813, and an input point index of a corresponding input point, into 3 groups, and outputs the 3 group signals to corresponding N-point IFFT modules.

That is, the first shuffler 813 outputs N signals received through the input points corresponding to the input point indexes having a modulo-3 operation result value of 0 to the first N-point IFFT module 815-1, outputs N signals received through the input points corresponding to the input point indexes having a modulo-3 operation result value of 1 to the second N-point IFFT module 815-2, and in the same scheme, outputs N signals received through the input points corresponding to the input point indexes having a modulo-3 operation result value of 2 to the third N-point IFFT module 815-3.

The first N-point IFFT module 815-1 performs N-point IFFT on the signal output from the first shuffler 813, and outputs the resultant signal to the first multiplier 817-1. The first multiplier 817-1 multiplies the signal output from the first N-point IFFT module 815-1 by preset values, and outputs the resultant signal to the de-shuffler 819.

The second N-point IFFT module 815-2 performs N-point IFFT on the signal output from the first shuffler 813, and outputs the resultant signal to the second multiplier 817-2. The second multiplier 817-2 multiplies the signal output from the second N-point IFFT module 815-2 by preset values, and outputs the resultant signal to the de-shuffler 819.

The third N-point IFFT module 815-3 performs N-point IFFT on the signal output from the first shuffler 813, and outputs the resultant signal to the third multiplier 817-3. The third multiplier 817-3 multiplies the signal output from the third N-point IFFT module 815-3 by preset values, and outputs the resultant signal to the de-shuffler 819.

The de-shuffler 819 de-shuffles the signals output from the first multiplier 817-1 to the third multiplier 817-3 according to a de-shuffling scheme, and outputs the resultant signals to corresponding 3-point IDFT modules. The de-shuffler 819 includes a total of 3N output points, and the 3N output points each have an output point index, which sequentially increases one by one from 0 to 3N−1. The de-shuffling scheme outputs the signals output from the first multiplier 817-1 to the third multiplier 817-3 to the output points of the de-shuffler 819 that have the same indexes as the input point indexes of the first shuffler 813. That is, the de-shuffler 819 de-shuffles the signals output from the first multiplier 817-1 to the third multiplier 817-3, and outputs the corresponding signals to the first 3-point IDFT module 821-1 to the $N^{th}$ 3-point IDFT module 821-N through corresponding output points. In other words, the de-shuffler 819 sequentially groups 3 signals into N groups and outputs the N group signals from the first 3-point IDFT module 821-1 to the $N^{th}$ 3-point IDFT module 821-N through the output points corresponding to the output point indexes having the same values as the input point indexes at the first shuffler 813 of the corresponding signals.

The first 3-point IDFT module 821-1 performs 3-point IDFT on the signal output from the de-shuffler 819, and outputs the resultant signal to the second shuffler 823. The second 3-point IDFT module 821-2 performs 3-point IDFT on the signal output from the de-shuffler 819, and outputs the resultant signal to the second shuffler 823. In this scheme, the $N^{th}$ 3-point IDFT module 821-N, which is the last 3-point IDFT module, performs 3-point IDFT on the signal output from the de-shuffler 819, and outputs the resultant signal to the second shuffler 823.

The second shuffler 823 shuffles the signals output from the first 3-point IDFT module 821-1 to the $N^{th}$ 3-point IDFT module 821-N according to a second shuffling scheme, and outputs the resultant signals to the P/S converter 825. The second shuffler 823 includes a total of 3N input points, and the 3N input points each have an input point index, which sequentially increases one by one from 0 to 3N−1. The second shuffling scheme groups N signals having the same result value as the result obtained by performing a modulo-3 operation on a signal received through each of the 3N input points of the second shuffler 823, and an input point index of a corresponding input point, into 3 groups, and sequentially outputs the 3 group signals to the P/S converter 825.

The P/S converter 825 serial-converts the signal output from the second shuffler 823, and outputs the resultant signal to the transmission RF processor 827. The transmission RF processor 827 is equal in operation to the transmission RF processor 413 described with reference to FIG. 4, so a detailed description thereof will be omitted.

The signal transmitted by the BS 800 is received at the MS 850 via the reception antenna 851, and the received signal is delivered to the reception RF processor 853. The reception RF processor 853 performs a reception RF process on the received signal, i.e., down-coverts the received signal to a base band, filters the down-converted signal through a BPF according to a frequency bandwidth $W_{NB}$ used in the NB communication system, and outputs the RF-processed signal to the N-point FFT module 855. By filtering the received signal through the BPF according to the frequency bandwidth $W_{NB}$ used in the NB communication system, the MS 850 can demodulate the signal transmitted by the BS 800 through the N-point FFT module 855, and the N-point FFT module 855 performs N-point FFT on the signal output from the reception RF processor 853, thereby restoring the received signal to the original information data. Thereafter, the MS 850 recovers the actual traffic data targeting the MS 850 itself according to the control data in the information data.

A detailed description will now be made of the reason that downlink transmission/reception is possible in the downlink signal transmission/reception system in the case where the bandwidth of the EB communication system is 3 times the bandwidth of the NB communication system, as shown in FIG. 8.

A signal in the time domain, after undergoing 3N-point IDFT, can be represented by $$x(n) = \frac{1}{3N} \sum_{k=0}^{3N-1} X(k) e^{j\frac{2\pi}{3N}kn} \quad (10)$$

In Equation (10), x(n) denotes a signal in the time domain, after undergoing 3N-point IDFT. If the x(n) shown in Equation (10) is substituted by $k=3k_1+k_2$ ($0 \leq k_1 \leq N-1$, $0 \leq k_2 \leq 2$) and $n=Nn_1+n_2$ ($0 \leq n_1 \leq 2$, $0 \leq n_2 \leq N-1$), then $$x(n) = \frac{1}{3N} \sum_{k=0}^{3N-1} X(k) e^{j\frac{2\pi}{3N}kn} \quad (11)$$

$$= \frac{1}{3N} \sum_{k_2=0}^{2} \sum_{k_1=0}^{N-1} X(3k_1+k_2) e^{j\frac{2\pi}{3N}(3k_1+k_2)(Nn_1+n_2)}$$

$$= \frac{1}{3} \sum_{k_2=0}^{2} \left[ \sum_{k_1=0}^{N-1} \frac{1}{N} X(3k_1+k_2) e^{j\frac{2\pi}{N}k_1 n_2} \right] \left[ e^{j\frac{2\pi}{3N}k_2 n_2} \right] e^{j\frac{2\pi}{3}k_2 n_1}$$

It can be noted from Equation (11) that the signal x(n) in the time domain, after undergoing 3N-point DFT, is expressed as the signal that passed through 3 N-point FFT modules, 3 multipliers, and N 3-point DFT modules.

Therefore, the downlink signal transmission/reception with the lowest complexity is possible even in the case where the bandwidth of the EB communication system is not $2^m$ times the bandwidth of the NB communication system.

Figure 9:
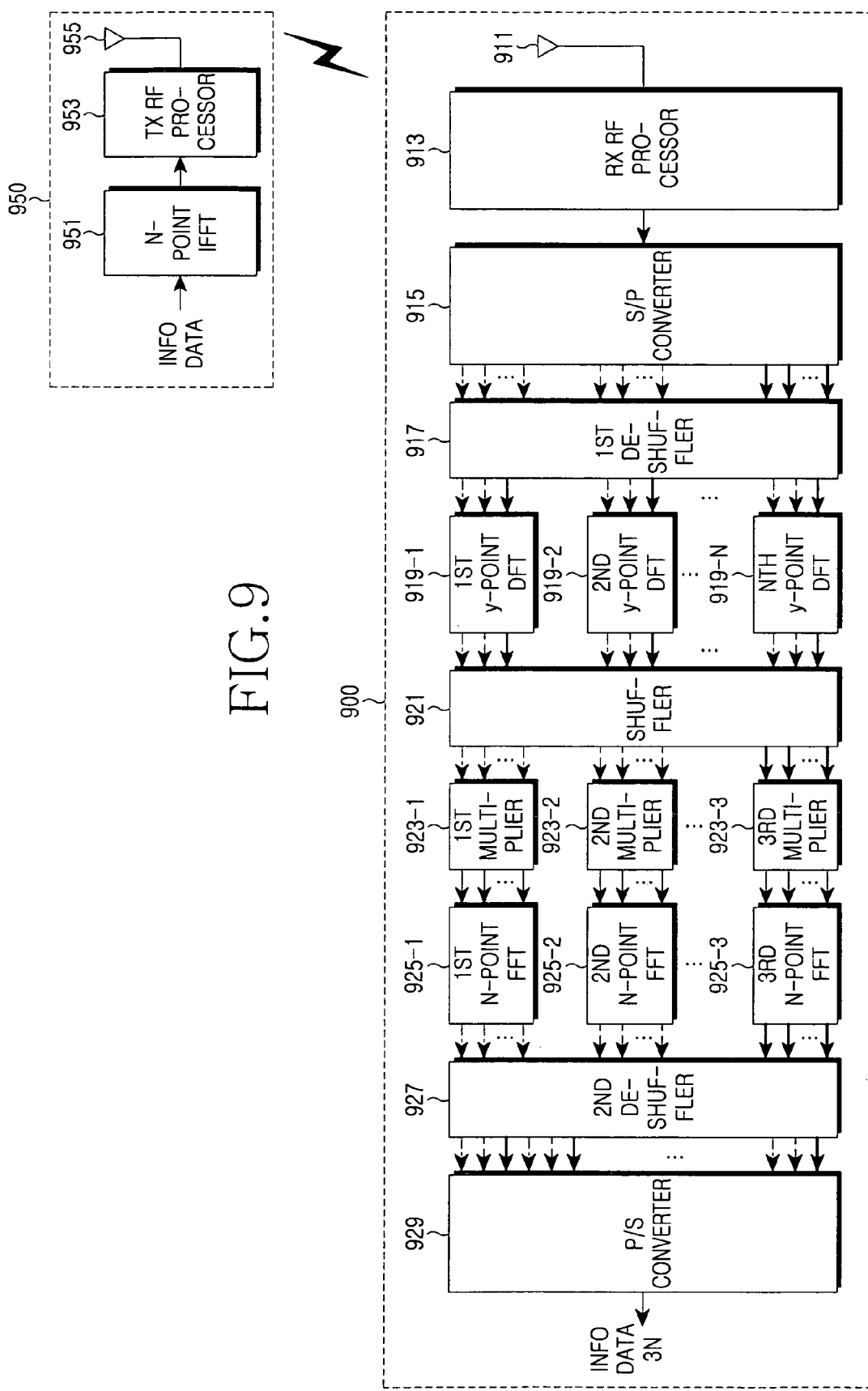
FIG. 9 is a diagram illustrating a structure of an uplink signal transmission/reception system in the case where a bandwidth of an EB communication system is 3 times a bandwidth of an NB communication system according to the present invention.

FIG. 9 is a diagram illustrating a structure of an uplink signal transmission/reception system in the case where a bandwidth of an EB communication system is, for example, 3 times a bandwidth of an NB communication system according to the present invention.

Referring to FIG. 9, the EB communication system includes a BS 900 and an MS 950. In the uplink signal transmission/reception operation, the BS 900 serves as a receiver for receiving the uplink signal, and the MS 950 serves as a transmitter for transmitting the uplink signal.

The BS 900 includes a reception antenna 911, a reception RF processor 913, an S/P converter 915, a first de-shuffler 917, N 3-point DFT modules of a first 3-point DFT module 919-1 to an $N^{th}$ 3-point DFT module 919-N, a shuffler 921, 3 multipliers of a first multiplier 923-1 to a third multiplier 923-3, 3 N-point FFT modules of a first N-point FFT module 925-1 to a third N-point FFT module 925-3, a second de-shuffler 927, and a P/S converter 929. The MS 950 includes an N-point IFFT module 951, a transmission RF processor 953, and a transmission antenna 955.

If there is information data to be transmitted from the MS 950 to the BS 900, the information data is delivered to the N-point IFFT module 951. The information data was previously coded through channel coding, and the channel coding operation is not directly related to the present invention, so a detailed description thereof will be omitted. In addition, the information data includes not only traffic data but also control data. It is assumed that resource positions for traffic data mapping of each MS are allocated such that the resource positions are disjoint from each other.

The N-point IFFT module 951 performs N-point IFFT on the input information data, and outputs the resultant signal to the transmission RF processor 953. Because the MS 950 performs only the N-point IFFT on the information data before transmission, the BS 900 receives actual information data only through the N points. The transmission RF processor 953 performs a transmission RF process on the signal output from the N-point IFFT module 951, i.e., up-converts the signal to a carrier frequency $f_{c2}$ used in the EB communication system, filters the up-converted signal through a BPF taking into account a bandwidth $W_{NB}$ used in the NB communication system, and transmits the RF-processed signal to the BS 900 via the transmission antenna 955.

The signal transmitted by the MS 950 is received at the BS 900 via the reception antenna 911, and the received signal is delivered to the reception RF processor 913. The reception RF processor 913 performs a reception RF process on the received signal, i.e., down-coverts the received signal to a base band, filters the down-converted signal through a BPF according to a frequency bandwidth $W_{EB}$ used in the EB communication system, and outputs the RF-processed signal to the S/P converter 915. The S/P converter 915 parallel-converts the signal output from the reception RF processor 913, and outputs the resultant signal to the first de-shuffler 917.

The first de-shuffler 917 de-shuffles the signal output from the S/P converter 915 according to a first de-shuffling scheme, and outputs the resultant signal to corresponding 3-point DFT modules. The first de-shuffler 917 includes a total of 3N output points, and the 3N output points each have an output point index, which sequentially increases one by one from 0 to 3N−1. The first de-shuffling scheme de-shuffles the signals, received at the first de-shuffler 917, shuffled by grouping N signals having modulo-3 operation result values of 0 to 3 into 3 groups, by sequentially grouping the 3 signals into N groups in ascending order of their output indexes, and outputs the N group signals to the first 3-point DFT module 919-1 to the $N^{th}$ 3-point DFT module 919-N.

The first 3-point DFT module 919-1 performs 3-point DFT on the signal output from the first de-shuffler 917, and outputs the resultant signal to the shuffler 921. The second 3-point DFT module 919-2 performs 3-point DFT on the signal output from the first de-shuffler 917, and outputs the resultant signal to the shuffler 921. In this scheme, the $N^{th}$ 3-point DFT module 919-N, which is the last 3-point DFT module, performs 3-point DFT on the signal output from the first de-shuffler 917, and outputs the resultant signal to the shuffler 921.

The shuffler 921 shuffles the signals output from the first 3-point DFT module 919-1 to the $N^{th}$ 3-point DFT module 919-N according to a shuffling scheme, and outputs the resultant signals to corresponding multipliers. The shuffler 921 includes a total of 3N input points, and the 3N input points each have an input point index, which sequentially increases one by one from 0 to 3N−1. The shuffling scheme groups N signals having the same result value as the result obtained by performing a modulo-3 operation on a signal received through each of the 3N input points of the shuffler 921, and an input point index of a corresponding input point, into 3 groups, and outputs the 3 group signals to corresponding multipliers.

That is, the shuffler 921 performs a modulo-3 operation on the signals output from the first 3-point DFT module 919-1 to the $N^{th}$ 3-point DFT module 919-N, outputs N signals received through the input points corresponding to the input point indexes having a modulo-3 operation result value of 0 to the first multiplier 923-1, outputs N signals received through the input points corresponding to the input point indexes having a modulo-3 operation result value of 1 to the second multiplier 923-2, and in this scheme, outputs N signals received through the input points corresponding to the input point indexes having a modulo-3 operation result value of 2 to the third multiplier 923-3.

The first multiplier 923-1 multiplies the signal output from the shuffler 921 by preset values, and outputs the resultant signal to the first N-point FFT module 925-1. The second multiplier 923-2 multiplies the signal output from the shuffler 921 by preset values, and outputs the resultant signal to the second N-point FFT module 925-2. The third multiplier 923-3 multiplies the signal output from the shuffler 921 by preset values, and outputs the resultant signal to the third N-point FFT module 925-3.

The first N-point FFT module 925-1 performs N-point FFT on the signal output from the first multiplier 923-1, and outputs the resultant signal to the second de-shuffler 927. The second N-point FFT module 925-2 performs N-point FFT on the signal output from the second multiplier 923-2, and outputs the resultant signal to the second de-shuffler 927. The third N-point FFT module 925-3 performs N-point FFT on the signal output from the third multiplier 923-3, and outputs the resultant signal to the second de-shuffler 927.

The second de-shuffler 927 de-shuffles the signals output from the first N-point FFT module 925-1 to the third N-point FFT module 925-3 according to a second de-shuffling scheme, and outputs the resultant signals to the P/S converter 929. The second de-shuffler 927 includes a total of 3N output points, and the 3N output points each have an output point index, which sequentially increases one by one from 0 to 3N−1. The second de-shuffling scheme outputs each of the signals output from the first N-point FFT module 925-1 to the third N-point FFT module 925-3 to the output points of the second de-shuffler 927, having the same indexes as the output point indexes of the first de-shuffler 917. That is, the second de-shuffler 927 de-shuffles the signals output from the first N-point FFT module 925-1 to the third N-point FFT module 925-3, and outputs the corresponding signals to the P/S converter 929 through corresponding output points of the second de-shuffler 927. In other words, the second de-shuffler sequentially maps the corresponding signals to the output points corresponding to the output point indexes having the same values as the output point indexes in the first de-shuffler 917, and outputs the resultant signals to the P/S converter 929. The P/S converter 929 serial-converts the signal output from the second de-shuffler 927, restoring the received signal to the original information data.

A detailed description will now be made of the reason that uplink transmission/reception is possible in the uplink signal transmission/reception system in the case where the bandwidth of the EB communication system is 3 times the bandwidth of the NB communication system, as shown in FIG. 9.

A signal in the frequency domain, after undergoing 3N-point DFT, can be represented by $$X(k) = \sum_{n=0}^{3N-1} x(n) e^{-j\frac{2\pi}{3N}kn} \quad (12)$$

In Equation (12), X(k) denotes a signal in the frequency domain, after undergoing 3N-point DFT. If the X(k) shown in Equation (12) is substituted by $k=3k_1+k_2$ ($0 \leq k_1 \leq N-1$, $0 \leq k_2 \leq 2$) and $n=Nn_1+n_2$ ($0 \leq n_1 \leq 2$, $0 \leq n_2 \leq N-1$), then $$X(k) = \sum_{n=0}^{3N-1} x(n) e^{-j\frac{2\pi}{3N}kn} \quad (13)$$

-continued $$= \sum_{n_2=0}^{N-1} \sum_{n_1=0}^{2} x(Nn_1+n_2) e^{-j\frac{2\pi}{3N}(3k_1+k_2)(Nn_1+n_2)}$$

$$= \sum_{n_2=0}^{N-1} \left[ \sum_{n_1=0}^{2} x(Nn_1+n_2) e^{-j\frac{2\pi}{3}k_2 n_1} \right] \left[ e^{-j\frac{2\pi}{3N}k_2 n_2} \right] e^{-j\frac{2\pi}{N}k_1 n_2}$$

It can be noted from Equation (13) that the signal X(k) in the frequency domain, after undergoing 3N-point DFT, is expressed as the signal that passed through 3 N-point FFT modules, 3 multipliers, and N 3-point DFT modules.

Therefore, the uplink signal transmission/reception with the lowest complexity is possible even in the case where the bandwidth of the EB communication system is 3 times the bandwidth of the NB communication system as described in connection with FIG. 9.

Figure 10:
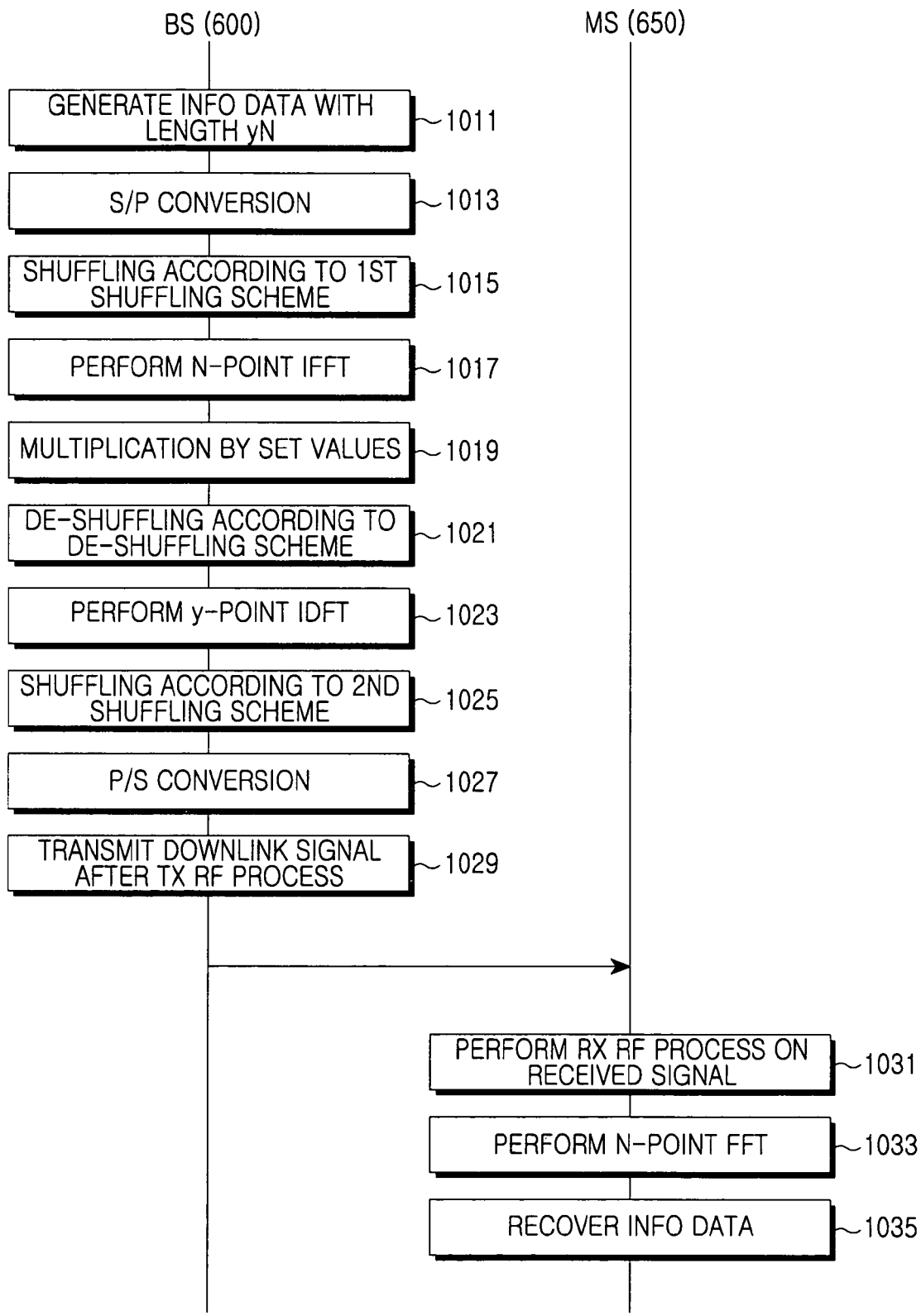
FIG. 10 is a signaling diagram illustrating a downlink signal transmission/reception process in the downlink signal transmission/reception system of FIG. 6.

FIG. 10 is a signaling diagram illustrating a downlink signal transmission/reception process in the downlink signal transmission/reception system of FIG. 6.

Referring to FIG. 10, if there is information data with a length yN to be transmitted to an MS 650 in step 1011, a BS 600 parallel converts the information data in step 1013. The BS 600 shuffles the parallel-converted signal according to a first shuffling scheme in step 1015, and performs N-point IFFT on the shuffled signal in step 1017.

The BS 600 multiplies the N-point IFFT-processed signal by preset values in step 1019, and de-shuffles the signal multiplied by the preset values according to a predetermined de-shuffling scheme in step 1021. The BS 600 performs y-point IDFT on the de-shuffled signal in step 1023, and shuffles the y-point IDFT-processed signal according to a second shuffling scheme in step 1025. The BS 600 serial-converts the shuffled signal in step 1027, and performs a transmission RF process on the serial-converted signal to generate a final downlink signal, and transmits the final downlink signal to the MS 650 in step 1029.

The MS 650 performs a reception RF process on the signal received from the BS 600 in step 1031, and performs N-point FFT on the RF-processed signal in step 1033. The MS 650 restores the N-point FFT-processed signal to the original information data in step 1035.

Figure 11:
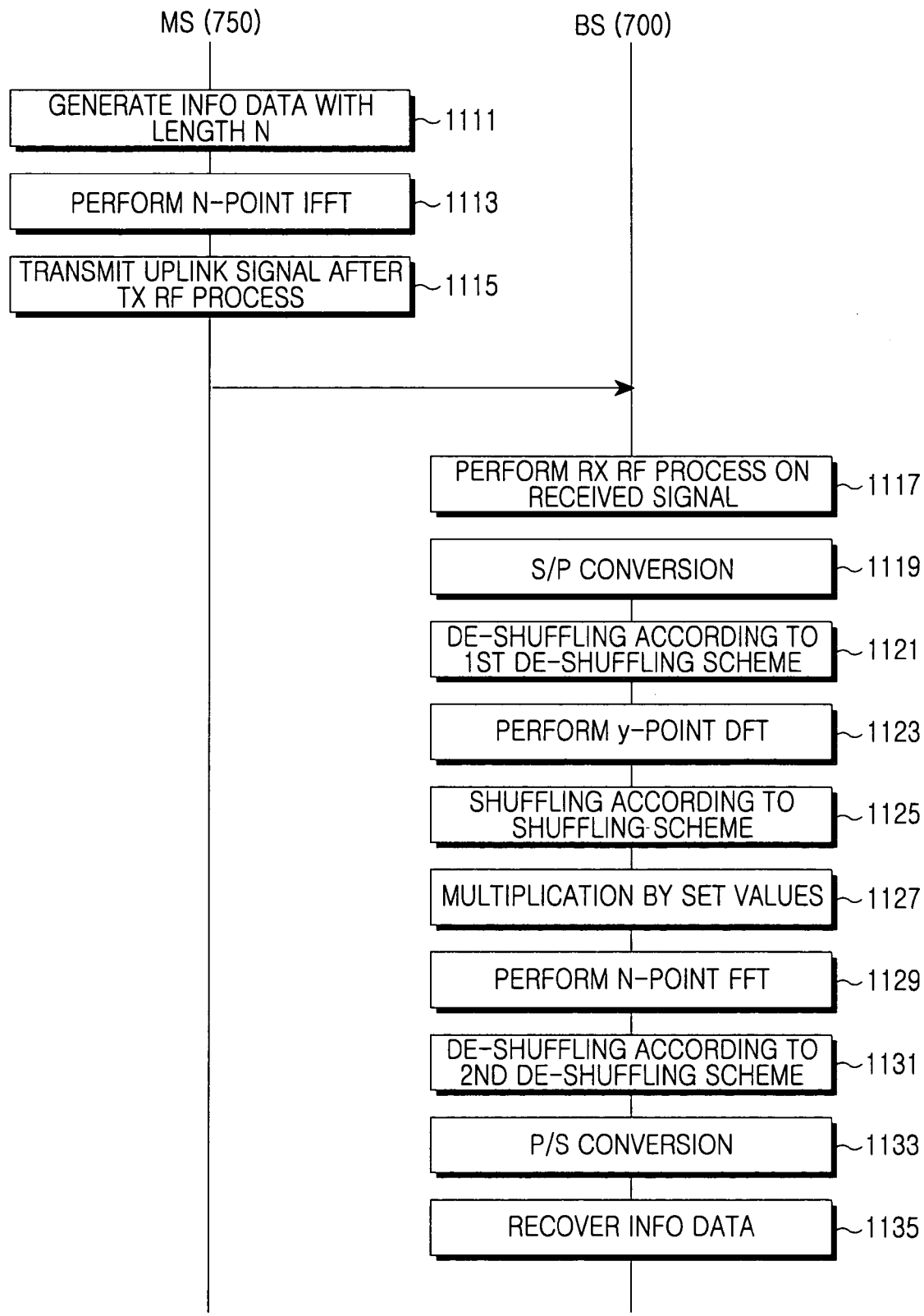
FIG. 11 is a signaling diagram illustrating an uplink signal transmission/reception process in the uplink signal transmission/reception system of FIG. 7.

FIG. 11 is a signaling diagram illustrating an uplink signal transmission/reception process in the uplink signal transmission/reception system of FIG. 7.

Referring to FIG. 11, if there is information data with a length N in step 1111, an MS 750 performs N-point IFFT on the information data in step 1113. The MS 750 performs a transmission RF process on the N-point IFFT-processed signal to generate an uplink signal, and transmits the uplink signal to a BS 700 in step 1115.

Then the BS 700 performs a reception RF process on the signal received from the MS 750 in step 1117, and parallel-converts the RF-processed signal in step 1119. The BS 700 de-shuffles the parallel-converted signal according to a first de-shuffling scheme in step 1121, and performs y-point DFT on the de-shuffled signal in step 1123. The BS 700 shuffles the y-point DFT-processed signal according to a shuffling scheme in step 1125, and multiplies the shuffled signal by preset values in step 1127.

The BS 700 performs N-point FFT on the signal multiplied by the preset values in step 1129, and de-shuffles the N-point FFT-processed signal according to a second de-shuffling scheme in step 1131. The BS 700 serial-converts the de-shuffled signal in step 1133, and restores the serial-converted signal to the original information data in step 1135.

The present invention has the following advantages.

(1) Reduction in License Cost for Frequency Band

The use of the frequency overlay communication system according to the present invention includes only the additional license cost for the bandwidth additionally increased. As a result, the burden of the license cost for the frequency bands on the service providers decreases because they are allowed to bear only the additional license cost.

(2) Increase in Frequency Resource Efficiency in Overlay Frequency Band

The use of the frequency overlay communication system according to the present invention increases frequency resource efficiency in the overlaid frequency band. That is, basically, user access increases in number in the overlay frequency band, thereby maximizing the multiuser diversity gain. The maximization of the multiuser diversity gain contributes to an increase in the frequency resource efficiency. Because the frequency resource efficiency is closely related to the profits of the service providers, the use of the frequency overlay communication system gives economic advantages to the service providers.

(3) Guarantee on Functions of Existing Users in Overlay Frequency Band

The application of the frequency overlay communication system according to the present invention guarantees the intact functions of the existing users, i.e., NB-MSs, before the application of the frequency overlay communication system.

(4) Preparation for Extension to Broadband System Supporting Backward Compatibility Because the application of the frequency overlay communication system according to the present invention guarantees the intact functions of the existing users, i.e., NB-MSs, before the application of the frequency overlay communication system, and also supports the broadband service, it can contribute to the evolutionary development of the next generation communication system.

(5) Preparation for Signal Transmission/Reception Basis for $W_{EB} \neq 2^m \times W_{NB}$ Signal transmission/reception with the lowest complexity is possible even in the case where the bandwidth of the extended band is not $2^m$ times the bandwidth of the existing band, thereby removing limitations on the bandwidth of extended bands.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a signal by a transmitter in a frequency overlay communication system, the method comprising:

generating y first signal groups by shuffling input information data with a length yN on an N-by-N grouping basis according to a first shuffling scheme;

generating y second signal groups by performing N-point Inverse Fast Fourier Transform (IFFT) on each of the y first signal groups;

generating y third signal groups by multiplying each of the y second signal groups by preset values;

generating N fourth signal groups by de-shuffling the y third signal groups on a y-by-y grouping basis according to a de-shuffling scheme;

generating N fifth signal groups by performing y-point Inverse Discrete Fourier Transform (IDFT) on each of the N fourth signal groups;

generating y sixth signal groups by shuffling the N fifth signal groups according to a second shuffling scheme, and serial-converting the y sixth signal groups; and performing a transmission radio frequency (RF) process on the serial-converted signal and transmitting the RF-processed signal to a receiver, wherein y is a positive integer based on a bandwidth of a first frequency band used by the frequency overlay communication system divided by a bandwidth of a second frequency band used by a non-frequency overlay communication system, and wherein N is a positive integer representing a number of IFFT points used in the non-frequency overlay communication system.

2. The method of claim 1, wherein the step of performing a transmission RF process comprises:

up-converting the serial-converted signal to a carrier frequency of the second frequency band, if the first frequency band includes the second frequency band and the receiver uses the second frequency band; and band-pass filtering the up-converted signal taking a bandwidth of the first frequency band into account, before transmission.

3. The method of claim 1, wherein the step of generating y first signal groups comprises:

parallel-converting the input information data with the length yN and sequentially assigning first input point indexes thereto, if the first frequency band includes the second frequency band; and performing a modulo-N operation on the first input point indexes, and grouping N signals with the first input point indexes having the same modulo-N operation result value, thereby sequentially generating the y first signal groups.

4. The method of claim 3, wherein the step of generating N fourth signal groups comprises sequentially arranging output point indexes of signals in each of the y third signal groups such that the output point indexes are equal to the first input point indexes of signals in each of the y third signal groups, and then grouping the arranged output point indexes on a y-by-y basis, thereby generating the N fourth signal groups.

5. The method of claim 4, wherein the step of generating y sixth signal groups comprises:

assigning second input point indexes to signals in each of the N fifth signal groups; and performing a modulo-N operation on the second input point indexes, and sequentially grouping N signals with input point indexes having the same modulo-N operation result value, thereby generating the y sixth signal groups.

6. A method for receiving a signal by a receiver in a frequency overlay communication system, the method comprising:

receiving a signal transmitted by a transmitter, and performing a reception radio frequency (RF) process on the received signal thereby generating received data with a length yN;

generating N first signal groups by de-shuffling the received data with the length yN on a y-by-y grouping basis according to a first de-shuffling scheme;

generating N second signal groups by performing Discrete Fourier Transform (DFT) on each of the N first signal groups;

generating y third signal groups by shuffling the N second signal groups on an N-by-N grouping basis according to a shuffling scheme;

generating y fourth signal groups by multiplying each of the y third signal groups by preset values;

generating y fifth signal groups by performing Fast Fourier Transform (FFT) on each of the y fourth signal groups; and de-shuffling the y fifth signal groups according to a second de-shuffling scheme, and then serial-converting the de-shuffled signal, thereby restoring the received signal to information data with a length yN, wherein y is a positive integer based on a bandwidth of a first frequency band used by the frequency overlay communication system divided by a bandwidth of a second frequency band used by a non-frequency overlay communication system, and wherein N is a positive integer representing a number of FFT points used in the non-frequency overlay communication system.

7. The method of claim 6, wherein the step of performing a reception RF process on comprises band-pass filtering the received signal taking a bandwidth of the first frequency band into account, thereby generating the received data with the length yN, if the first frequency band includes the second frequency band and the receiver uses the second frequency band.

8. The method of claim 6, wherein the step of generating N first signal groups comprises:

parallel-converting the received data with the length yN and sequentially assigning first output point indexes thereto, if the first frequency band includes the second frequency band, and after the received data with the length yN undergoes a modulo-N operation, N signals having the same modulo-N operation result value are grouped into y groups and sequentially arranged; and generating the N first signal groups by sequentially grouping y signals such that the first output point indexes sequentially increase.

9. The method of claim 8, wherein the step of generating y third signal groups comprises:

assigning input point indexes to signals in each of the N second signal groups; and performing a modulo-y operation on the input point indexes for signals in each of the N second signal groups, and generating the y third signal groups by grouping N signals with input point indexes having the same modulo-y operation result value.

10. The method of claim 9, wherein the step of de-shuffling the y fifth signal groups comprises:

assigning second output point indexes to signals in each of the y fifth signal groups; and arranging the second output point indexes of signals in each of the y fifth signal groups such that the second output point indexes have the same indexes as the first output point indexes, and serial-converting the arranged signal thereby restoring the received signal to the information data with the length yN.

11. A method for transmitting/receiving a signal in a frequency overlay communication system, the method comprising:

generating, by a transmitter, y first signal groups by shuffling input information data with a length yN on an N-by-N grouping basis according to a first shuffling scheme;

generating, by the transmitter, y second signal groups by performing N-point Inverse Fast Fourier Transform (IFFT) on each of the y first signal groups;

generating, by the transmitter, y third signal groups by multiplying each of the y second signal groups by preset values;

generating, by the transmitter, N fourth signal groups by de-shuffling the y third signal groups on a y-by-y grouping basis according to a de-shuffling scheme;

generating, by the transmitter, N fifth signal groups by performing y-point Inverse Discrete Fourier Transform (IDFT) on each of the N fourth signal groups;

generating, by the transmitter, y sixth signal groups by shuffling the N fifth signal groups according to a second shuffling scheme, and serial-converting the y sixth signal groups;

performing, by the transmitter, a transmission radio frequency (RF) process on the serial-converted signal and transmitting the RF-processed signal to a receiver;

receiving, by the receiver, the RF-processed signal transmitted by the transmitter and performing a reception RF process on the received signal; and performing, by the receiver, Fast Fourier Transform (FFT) on the RF-processed signal, wherein y is a positive integer based on a bandwidth of a first frequency band used by the frequency overlay communication system divided by a bandwidth of a second frequency band used by a non-frequency overlay communication system, and wherein N is a positive integer representing a number of IFFT/FFT points used in the non-frequency overlay communication system.

12. The method of claim 11, wherein the step of performing, by the transmitter, a transmission RF process comprises:

up-converting the serial-converted signal to a carrier frequency of the second frequency band, if the first frequency band includes the second frequency band and the receiver uses the second frequency band; and band-pass filtering the up-converted signal taking a bandwidth of the first frequency band into account, before transmission.

13. The method of claim 11, wherein the step of generating, by the transmitter, y first signal groups comprises:

parallel-converting the input information data with the length yN and sequentially assigning first input point indexes thereto, if the first frequency band includes the second frequency band; and performing a modulo-N operation on the first input point indexes, and grouping N signals with the first input point indexes having the same modulo-N operation result value, thereby sequentially generating the y first signal groups.

14. The method of claim 13, wherein the step of generating, by the transmitter, N fourth signal groups comprises sequentially arranging output point indexes of signals in each of the y third signal groups such that the output point indexes are equal to the first input point indexes of signals in each of the y third signal groups, and then grouping the arranged output point indexes on a y-by-y basis, thereby generating the N fourth signal groups.

15. The method of claim 14, wherein the step of generating, by the transmitter, y sixth signal groups comprises:

assigning second input point indexes to signals in each of the N fifth signal groups; and performing a modulo-N operation on the second input point indexes, and sequentially grouping N signals with input point indexes having the same modulo-N operation result value, thereby generating the y sixth signal groups.

16. The method of claim 11, wherein the step of performing, by the receiver, a reception RF processor comprises performing band-pass filtering according to a bandwidth of the second frequency band, if the first frequency band includes the second frequency band, the transmitter uses the first frequency band, and the receiver uses the second frequency band.

17. A method for transmitting/receiving a signal in a frequency overlay communication, the method comprising:
    performing, by a transmitter, Inverse Fast Fourier Transform (IFFT) on the information data if there is information data to transmit;
    performing, by the transmitter, a transmission radio frequency (RF) process on the IFFT-processed signal, and transmitting the RF-processed signal to a receiver;
    receiving, by the receiver, the RF-processed signal transmitted by the transmitter, and performing a reception RF process on the received signal thereby generating received data with a length yN;
    generating, by the receiver, N first signal groups by de-shuffling the received data with the length yN on a y-by-y grouping basis according to a first de-shuffling scheme;
    generating, by the receiver, N second signal groups by performing Discrete Fourier Transform (DFT) on each of the N first signal groups;
    generating, by the receiver, y third signal groups by shuffling the N second signal groups on an N-by-N grouping basis according to a shuffling scheme;
    generating, by the receiver, y fourth signal groups by multiplying each of the y third signal groups by preset values;
    generating, by the receiver, y fifth signal groups by performing Fast Fourier Transform (FFT) on each of the y fourth signal groups; and
    de-shuffling, by the receiver, the y fifth signal groups according to a second de-shuffling scheme, and then serial-converting the de-shuffled signal thereby restoring the received signal to information data with the length yN,
    wherein y is a positive integer based on a bandwidth of a first frequency band used by the frequency overlay communication system divided by a bandwidth of a second frequency band used by a non-frequency overlay communication system, and
    wherein N is a positive integer representing a number of IFFT/FFT points used in the non-frequency overlay communication system.

18. The method of claim 17, wherein the step of performing, by the transmitter, a transmission RF process on the IFFT-processed signal comprises:
    up-converting the IFFT-processed signal to a carrier frequency of the first frequency band, if the first frequency band includes the second frequency band, the transmitter uses the second frequency band, and the receiver uses the first frequency band; and
    performing band-pass filtering on the up-converted signal according to a bandwidth of the second frequency band.

19. The method of claim 17, wherein the step of performing, by the receiver, a reception RF process on the received signal comprises performing band-pass filtering on the received signal taking a bandwidth of the first frequency band into account, thereby generating the received data with the length yN, if the first frequency band includes the second frequency band, and the receiver uses the second frequency band.

20. The method of claim 19, wherein the step of generating, by the receiver, N first signal groups comprises:
    parallel-converting the received data with the length yN and sequentially assigning first output point indexes thereto, if the first frequency band includes the second frequency band, and after the received data with the length yN undergoes a modulo-N operation, N signals having the same modulo-N operation result value are grouped into y groups and sequentially arranged; and
    generating the N first signal groups by sequentially grouping y signals such that the first output point indexes sequentially increase.

21. The method of claim 20, wherein the step of generating, by the receiver, y third signal groups comprises:
    assigning input point indexes to signals in each of the N second signal groups; and
    performing a modulo-y operation on the input point indexes for signals in each of the N second signal groups, and generating the y third signal groups by grouping N signals with input point indexes having the same modulo-y operation result value.

22. The method of claim 21, wherein the step of de-shuffling, by the receiver, the fifth signal groups according to a second de-shuffling scheme comprises:
    assigning second output point indexes to signals in each of the y fifth signal groups; and
    arranging the second output point indexes of signals in each of the y fifth signal groups such that the second output point indexes have the same indexes as the first output point indexes, and serial-converting the arranged signal thereby restoring the received signal to the information data with the length yN.

23. A transmitter in a frequency overlay communication system, the transmitter comprising:
    a first shuffler for generating y first signal groups by shuffling input information data with a length yN on an N-by-N grouping basis according to a first shuffling scheme;
    N Inverse Fast Fourier Transform (IFFT) modules for generating y second signal groups by performing N-point IFFT on each of the y first signal groups;
    y multipliers for generating y third signal groups by multiplying each of the y second signal groups by preset values;
    a de-shuffler for generating N fourth signal groups by de-shuffling the y third signal groups on a y-by-y grouping basis according to a predetermined de-shuffling scheme;
    N Inverse Discrete Fourier Transform (IDFT) modules for generating N fifth signal groups by performing y-point IDFT on each of the N fourth signal groups;
    a second shuffler for generating y sixth signal groups by shuffling the N fifth signal groups according to a second shuffling scheme;
    a parallel-to-serial (P/S) converter for serial-converting the y sixth signal groups; and
    a transmission radio frequency (RF) processor for performing a transmission RF process on the serial-converted signal and transmitting the RF-processed signal to a receiver,
    wherein y is a positive integer based on a bandwidth of a first frequency band used by the frequency overlay communication system divided by a bandwidth of a second frequency band used by a non-frequency overlay communication system, and wherein N is a positive integer representing a number of IFFT points used in the non-frequency overlay communication system.

24. The transmitter of claim 23, wherein if the frequency first frequency band includes the second frequency band, and the receiver uses the second frequency band, the transmission RF processor up-converts the serial-converted signal to a carrier frequency of the second frequency band, and band-pass filters the up-converted signal taking a bandwidth of the first frequency band into account, before transmission.

25. The transmitter of claim 24, wherein if the first frequency band includes the second frequency band, the first shuffler performs a modulo-N operation on first input point indexes mapped to input points to which signals output from the S/P converter are input, and groups N signals with the first input point indexes having the same modulo-N operation result value thereby generating the y first signal groups.

26. The transmitter of claim 25, wherein the de-shuffler sequentially arranges output point indexes for each of the y multipliers for signals in each of the y third signal groups such that the output point indexes are equal to the first input point indexes of the signals in each of the y third signal groups, and then groups the arranged output point indexes on a y-by-y basis, thereby generating the N fourth signal groups.

27. The transmitter of claim 26, wherein the second shuffler performs a modulo-N operation on the second input point indexes mapped to its input points for signals in each of the N fifth signal groups, received through the input points, and groups N signals with input point indexes having the same modulo-N operation result value thereby sequentially generating the y sixth signal groups.

28. The transmitter of claim 23, further comprising a serial-to-parallel (S/P) converter for parallel-converting the input information data with the length yN.

29. A receiver in a frequency overlay communication system, the receiver comprising:

a reception radio frequency (RF) processor for receiving a signal transmitted by a transmitter, and performing a reception RF process on the received signal thereby generating received data with a length yN;

a first de-shuffler for generating N first signal groups by de-shuffling the received data with the length yN on a y-by-y grouping basis according to a first de-shuffling scheme;

N Discrete Fourier Transform (DFT) modules for generating N second signal groups by performing DFT on each of the N first signal groups;

a shuffler for generating y third signal groups by shuffling the N second signal groups on an N-by-N grouping basis according to a predetermined shuffling scheme;

y multipliers for generating y fourth signal groups by multiplying each of the third signal groups by preset values;

y Fast Fourier Transform (FFT) modules for generating y fifth signal groups by performing FFT on each of the y fourth signal groups;

a second de-shuffler for de-shuffling the y fifth signal groups according to a second de-shuffling scheme; and a parallel-to-serial (P/S) converter for serial-converting the de-shuffled signal thereby restoring the received signal to information data with the length yN, wherein y is a positive integer based on a bandwidth of a first frequency band used by the frequency overlay communication system divided by a bandwidth of a second frequency band used by a non-frequency overlay communication system, and wherein N is a positive integer representing a number of FFT points used in the non-frequency overlay communication system.

30. The receiver of claim 29, wherein if the the first frequency band includes the second frequency band and the receiver uses the second frequency band, the reception RF processor band-pass filters the received signal taking a bandwidth of the first frequency band into account, thereby generating the received data with the length yN.

31. The receiver of claim 29, further comprising a serial-to-parallel (S/P) converter for parallel-converting the received data with the length yN.

32. The receiver of claim 31, wherein if the first frequency band includes the second frequency band, the first de-shuffler performs a modulo-N operation on the received data with the length yN, sequentially arranges N signals having the same modulo-N operation result value into y groups, receives a signal output from the S/P converter, and generates the N first signal groups by sequentially grouping y signals such that first output point indexes of the first de-shuffler sequentially increase.

33. The receiver of claim 32, wherein the shuffler performs a modulo-y operation on input point indexes to which signals in each of the N second signal groups are input, and generates the y third signal groups by grouping N signals with input point indexes having the same modulo-y operation result value.

34. The receiver of claim 32, wherein the second de-shuffler arranges second output point indexes of signals in each of the y fifth signal groups such that the second output point indexes have the same indexes as the first output point indexes.

* * * * *